(12) United States Patent
Kawaoka

(10) Patent No.: US 8,512,888 B2
(45) Date of Patent: Aug. 20, 2013

(54) CURRENT COLLECTOR AND METHOD FOR PRODUCING THE SAME, BATTERY AND METHOD FOR PRODUCING THE SAME

(75) Inventor: Hirokazu Kawaoka, Nissin (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/062,812

(22) PCT Filed: Mar. 11, 2010

(86) PCT No.: PCT/JP2010/054087
§ 371 (c)(1),
(2), (4) Date: Mar. 8, 2011

(87) PCT Pub. No.: WO2011/111200
PCT Pub. Date: Sep. 15, 2011

(65) Prior Publication Data
US 2012/0328921 A1 Dec. 27, 2012

(51) Int. Cl.
*H01M 4/66* (2006.01)
(52) U.S. Cl.
USPC .............................. 429/94; 429/152; 429/211
(58) Field of Classification Search
USPC ........................................... 429/94, 211, 152
See application file for complete search history.

(56) References Cited

U.S. PATENT DOCUMENTS 3,826,926 A * 7/1974 White et al. .................... 377/57
5,582,931 A 12/1996 Kawakami

FOREIGN PATENT DOCUMENTS

| JP | A-6-187998 | 7/1994 |
|---|---|---|
| JP | A-10-241699 | 9/1998 |
| JP | A-2000-100471 | 4/2000 |
| JP | A-2001-332290 | 11/2001 |
| JP | A-2002-42855 | 2/2002 |
| JP | B2-3419311 | 4/2003 |
| JP | A-2003-282064 | 10/2003 |
| JP | A-2005-183113 | 7/2005 |
| JP | A-2005-268138 | 9/2005 |
| JP | A-2007-18809 | 1/2007 |
| JP | A-2007-95597 | 4/2007 |
| JP | A-2007-335206 | 12/2007 |
| JP | A-2010-73500 | 4/2010 |

OTHER PUBLICATIONS

International Search Report issued in International Application No. PCT/JP2010/054087 on Jun. 15, 2010 (with translation).

* cited by examiner

*Primary Examiner* — Nicholas P D'Aniello
(74) *Attorney, Agent, or Firm* — Oliff & Berridge, PLC

(57) ABSTRACT

The present invention provides a current collector, a battery including the current collector, which are capable of increasing energy density or output density and improving productivity or stability; it also provides a method for producing the current collector and a method for producing the battery. The current collector comprises: an insulating substrate; and electron-conducting portions respectively disposed on one face and the other face of the insulating substrate, at least two of the electron-conducting portions being disposed in a planar direction on the one face of the insulating substrate, the electron-conducting portions which is disposed on the other face of the insulating substrate being disposed in a manner to face at least one of the electron-conducting portions disposed on the one face of the insulating substrate so that the insulating substrate is interposed therebetween, and the electron-conducting portions disposed on the one face of the insulating substrate and the electron-conducting portions disposed on the other face of the insulating substrate, both of which face each other with the insulating substrate interposed therebetween, are connected to each other via electron conductors disposed in holes penetrating the insulating substrate.

1 Claim, 21 Drawing Sheets

CURRENT COLLECTOR AND METHOD FOR PRODUCING THE SAME, BATTERY AND METHOD FOR PRODUCING THE SAME

TECHNICAL FIELD

The present invention relates to a current collector and a method for producing the same, and also relates to a battery and a method for producing the same.

BACKGROUND ART

Lithium-ion secondary batteries have characteristics in which energy density is higher and an operation is possible at high voltage compared to other secondary batteries. Therefore, as second batteries that can be easily reduced in size and weight, the lithium-ion secondary batteries have been used in information apparatuses such as cellular phones. In recent years, a demand for large-scale power used for, for example, electric automobiles or hybrid automobiles has been increased.

A lithium-ion secondary battery includes a cathode layer, an anode layer, and an electrolyte disposed therebetween. The electrolyte consists of a non-aqueous liquid or a solid. When a non-aqueous liquid (hereinafter, referred to as an "electrolytic solution") is used as the electrolyte, the electrolytic solution is introduced into the cathode layer. Therefore, the interface between a cathode active material of the cathode layer and the electrolyte is easily formed and the performance is easily improved. However, since a general electrolytic solution is combustible, it is necessary to mount a system for ensuring safety. On the contrary, when a solid electrolyte is incombustible, the system can be simplified. Accordingly, there have been suggested lithium-ion secondary batteries (hereinafter, referred to as "solid batteries") which include a layer (hereinafter, referred to as a "solid electrolyte layer") containing an incombustible solid electrolyte.

As a technique for a lithium-ion secondary battery, for example, Patent Document 1 discloses the planar alignment configuration of charge bodies in which a plurality of planar charge bodies are aligned, the charge bodies are electrically connected to each other, and a reinforcement member having a bending degree of freedom is suspended between the plurality of charge bodies. Moreover, Patent Document 2 discloses a battery current collector which includes a mix layer containing a host material capable of absorbing and discharging an active material or a lithium ion and which includes an insulation base body, communication holes communicating with both faces of the base body, and electron conductors disposed in the both faces of the base body, wherein the electron conductors disposed in the both faces of the base body are electrically connected to each other via the communication holes. Patent Document 3 discloses a battery module in which power generation elements are vertically and horizontally arrayed and stored in a container body, and the adjacent power generation elements are all connected in series while being electrically connected to each other by lead terminals, and in which cathode terminals extending from one end of the power generation elements and anode terminals extending from the other end of the power generation elements protrude from the peripheral edge of the container body. Patent Document 4 discloses a sheet battery which includes: a solid electrolyte; and a bipolar electrode unit which comprises: a positive active material layer on a current collector layer for a cathode of a complex current collector, one face of which is the current collector layer for a cathode and the other face of which is a current collector layer for a anode; and a anode active material layer on the current collector layer for a anode, wherein the bipolar electrode unit and the solid electrolyte are alternately laminated.

CITATION LIST

Patent Literatures
Patent Document 1: Japanese Patent Application Laid-Open (JP-A) No. 2005-268138
Patent Document 2: JP-A No. 10-241699
Patent Document 3: JP-A No. 2007-095597
Patent Document 4: JP-A No. 2000-100471

SUMMARY OF THE INVENTION

Problems to be Solved by the Invention

According to the art disclosed in Patent Document 1, since the reinforcement member having a bending degree of freedom is suspended between the plurality of charge bodies, it is considered that the bending degree of freedom may be ensured. However, the art disclosed in Patent Document 1 has a problem that productivity is reduced since it requires a process of separately mounting the reinforcement member. When the conductive member is disposed on the entire surface of the insulation base body, as seen from the art disclosed in Patent Document 2, the insulation base body is rarely bent; thereby a problem of reduction in productivity may arise. The art disclosed in Patent Document 3 has problems such that it is difficult to reduce dead spaces which do not contribute to charge or discharge and that stability of contact resistors is not ensured since the peripheral portions of the power generation elements are thermally adhered to lower surfaces of the lid members facing the power generation elements. The art disclosed in Patent Document 4 has a problem that productivity is reduced compared to a winding case since the sheet electrode and the solid electrolyte are laminated.

Accordingly, an object of the invention is to provide a current collector, a battery including the current collector, and a method for producing the current collector and a method for producing the battery, these of which are capable of improving productivity and stability of the battery.

Means for Solving the Problems

To solve these problems, the first aspect of the present invention provides a current collector comprising: an insulating substrate; and electron-conducting portions respectively disposed on one face and the other face of the insulating substrate, at least two of the electron-conducting portions being disposed in a planar direction on the one face of the insulating substrate, the electron-conducting portions which is disposed on the other face of the insulating substrate being disposed in a manner to face at least one of the electron-conducting portions disposed on the one face of the insulating substrate so that the insulating substrate is interposed therebetween, and the electron-conducting portions disposed on the one face of the insulating substrate and the electron-conducting portions disposed on the other face of the insulating substrate, both of which face each other with the insulating substrate interposed therebetween, are connected to each other via electron conductors disposed in holes penetrating the insulating substrate.

The second aspect of the invention is a battery comprising: the current collector according to the first aspect of the invention; a cathode layer and an anode layer respectively disposed to be in contact with the electron-conducting portions of the current collector; and an electrolyte layer disposed to be in contact with the cathode layer and the anode layer, wherein the current collector, the cathode layer, the anode layer, and the electrolyte layer are stacked or wound by bending a portion between the adjacent electron-conducting portions arranged on the one face of the insulating substrate.

The third aspect of the invention is a method for producing a current collector, comprising: disposing electron conductors in through-holes formed in an insulating substrate; disposing at least two electron-conducting portions in a planar direction at an interval on portions of one face of the insulating substrate in a manner to contact the electron conductors disposed in the through-holes; and disposing electron-conducting portions on portions of the other face of the insulating substrate in a manner to contact the electron conductors disposed in the through-holes.

The fourth aspect of the invention is a method for producing a battery which comprises a current collector having an insulating substrate and electron-conducting portions disposed on one face and the other face of the insulating substrate, a cathode layer and an anode layer respectively disposed to be in contact with the current collector, and an electrolyte layer disposed to be in contact with the cathode layer and the anode layer, the method comprising: producing the current collector in accordance with the method according to the third aspect of the invention; disposing the cathode layers and the anode layers to respectively be in contact with the electron-conducting portions disposed on the faces of the insulating substrate; disposing the electrolyte layers to be in contact with the cathode layers and/or the anode layers; and stacking or winding the current collector, the cathode layers, the anode layers, and the electrolyte layers by bending or winding a portion between the adjacent electron-conducting portions arranged on the one face of the insulating substrate.

Effects of the Invention

The current collector according the first aspect of the invention includes at least two electron-conducting portions disposed in the planar direction at an interval. According to this mode, the plurality of electrodes and the plurality of electron-conducting portions of the current collector can be brought into contact with each other at once when the battery including the current collector is produced; thereby it is possible to improve the productivity of the battery. Moreover, since the current collector of the invention includes at least two electron-conducting portions disposed at an interval, the insulating substrate present between the electron-conducting portions enables short circuit to be prevented between the electrodes of the battery including the current collector according to the invention. Accordingly, according to the first aspect of the invention, it is possible to provide the current collector capable of improving the productivity and stability of the battery.

The battery according to the second aspect of the invention includes the current collector according to the first aspect of the invention which is capable of improving the productivity or stability of the battery. Accordingly, according to the second aspect of the invention, it is possible to provide the battery capable of improving its productivity and stability.

In the method for producing the current collector according to the third aspect of the invention, it is possible to produce the current collector according to the first aspect of the invention. Accordingly, according to the third aspect of the invention, it is possible to provide the method for producing the current collector capable of improving the productivity and stability of the battery.

In the method for producing the battery according to the fourth aspect of the invention, the battery according to the second aspect of the invention can be produced. Accordingly, according to the fourth aspect of the invention, it is possible to provide the method for producing the battery capable of improving its productivity and stability.

Figure 1:
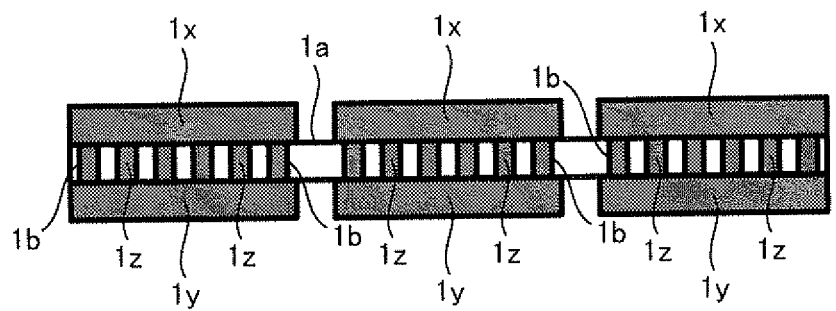
FIG. 1 is a cross-sectional view illustrating a current collector 1.

DESCRIPTION OF THE REFERENCE NUMERALS 1, 12 current collector
1a insulating substrate
1b hole
1x, 12x electron-conducting portion 1y, 12y electron-conducting portion
1z electron conductor
2, 13 cathode layer
3, 14 anode layer
4, 15 electrolyte layer
5, 6, 18 electrode body
7, 19 terminal
8, 16, 20 stacked body
9, 17, 21 wound body
10, 11 structure body
22 shaft center
23 electrode body
24 stacked body
25, 26 structure body

DESCRIPTION OF MODES FOR CARRYING OUT THE INVENTION

In order to improve energy density and output density, there have been developed batteries which have a structure body produced by winding or folding stacked bodies including current collectors, electrodes (i.e. cathode layer and anode layer), and electrolyte layers. In the suggested batteries, however, the number of layers (sheets) forming the stacked body tends to be easily increased. When the number of sheets increases, the winding speed or the folding speed is easily reduced, thereby reducing the productivity of the batteries. In the batteries including the structure body, slipping-off of electrodes or the like and short-circuit may occur when the structure body is produced by winding or folding the stacked bodies; thereby stability of the battery is easily deteriorated. Accordingly, in order to obtain a battery which improves its productivity and stability, it is necessary to inhibit the increase in the number of sheets and to suppress the slipping-off of electrodes or the like.

As a result of the intensive study by the inventors, they discovered that the productivity and stability of a battery can be improved by using a current collector in which electron-conducting portions are formed at an interval on parts of the front and rear faces of an insulating substrate, and the electron-conducting portions on the front face and the electron-conducting portions on the rear face are connected to each other by conductive materials disposed in holes penetrating the insulating substrate.

The invention has been completed based on the study. An object of the invention is to provide a current collector, a battery including the current collector, a method for producing the current collector, and a method for producing the battery, these of which can improve productivity and stability of the battery.

Hereinafter, the invention will be described with reference to the drawings. In the drawings, reference numerals may sometimes be omitted. The below-described embodiment is just an example of the invention, and the invention is not limited to the embodiment. Examples of the insulating substrate according to the invention include a sheet form or a film form.

Figure 2:
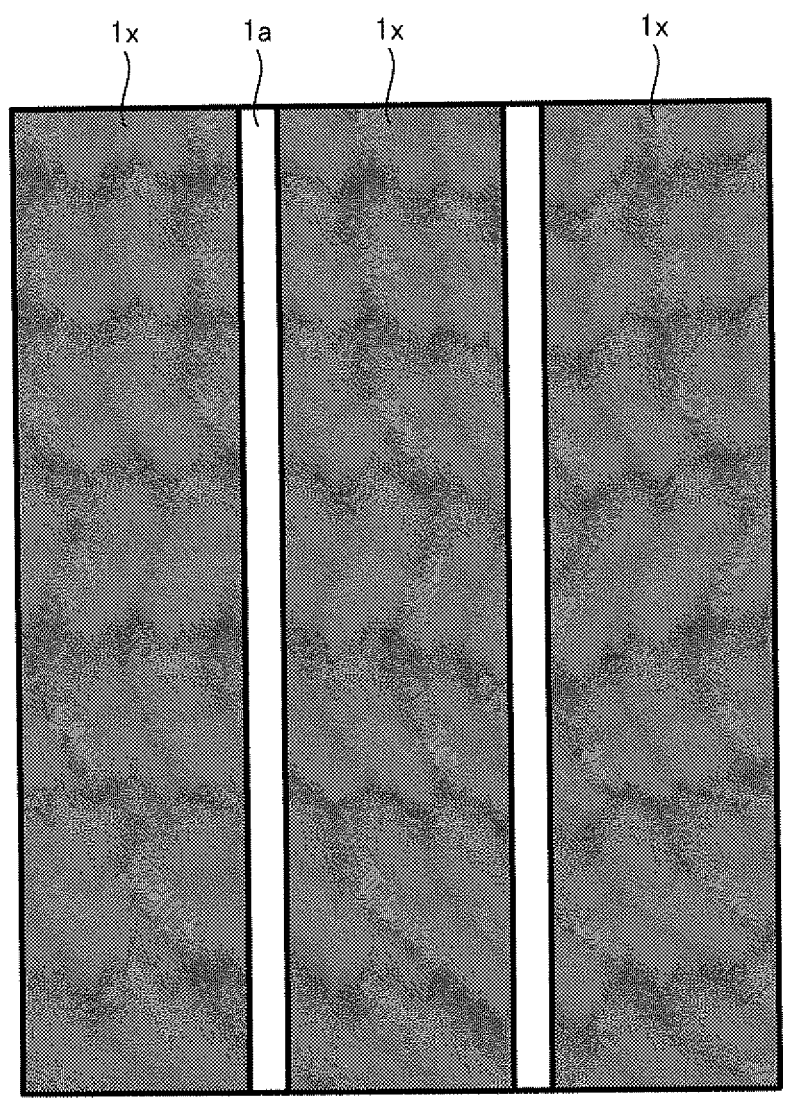
FIG. 2 is a front view illustrating the current collector 1.

FIG. 1 is a cross-sectional view illustrating a current collector 1 according to the invention. FIG. 2 is a front view illustrating the current collector 1. As shown in FIGS. 1 and 2, the current collector 1 has an insulating substrate 1a, electron-conducting portions 1x, 1x, . . . formed at an interval on one face of the insulating substrate 1a, and electron-conducting portions 1y, 1y, . . . formed at an interval on the other face of the insulating substrate 1a. The electron-conducting portions 1x, 1x, . . . and the electron-conducting portions 1y, 1y, . . . face each other with the insulating substrate 1a interposed therebetween. The insulating substrate 1a includes a plurality of holes 1b, 1b, . . . penetrating the insulating substrate 1a. Electron conductors 1z, 1z, . . . are disposed in the holes 1b, 1b, . . . , respectively. The electron-conducting portions 1x, 1x, . . . and the electron-conducting portions 1y, 1y, . . . facing each other with the insulating substrate 1a interposed therebetween are connected to each other via the electron conductors 1z, 1z, . . . .

The current collector 1 has the electron-conducting portions 1x, 1x, . . . and the electron-conducting portions 1y, 1y, . . . both disposed at an interval in a planar direction (right and left directions in FIGS. 1 and 2; below, it is the same in the description of the current collector 1). Therefore, when the battery including the current collector 1 is produced, it is possible to bring a plurality of electrodes at once into contact with the plurality of electron-conducting portions 1x, 1x, . . . or the plurality of electron-conducting portions 1y, 1y, . . . of the current collector 1. Accordingly, the productivity of the battery can be improved by using the current collector 1. Moreover, since the electron-conducting portions 1x, 1x, . . . and the electron-conducting portions 1y, 1y, . . . of the current collector 1 are arranged at an interval in the planar direction, short circuit between the electrodes of the battery including the current collector 1 may be prevented by the insulating substrate 1a present between the adjacent electron-conducting portions. Therefore, according to the current collector 1, the productivity and the stability of the battery can be improved.

Figure 3:
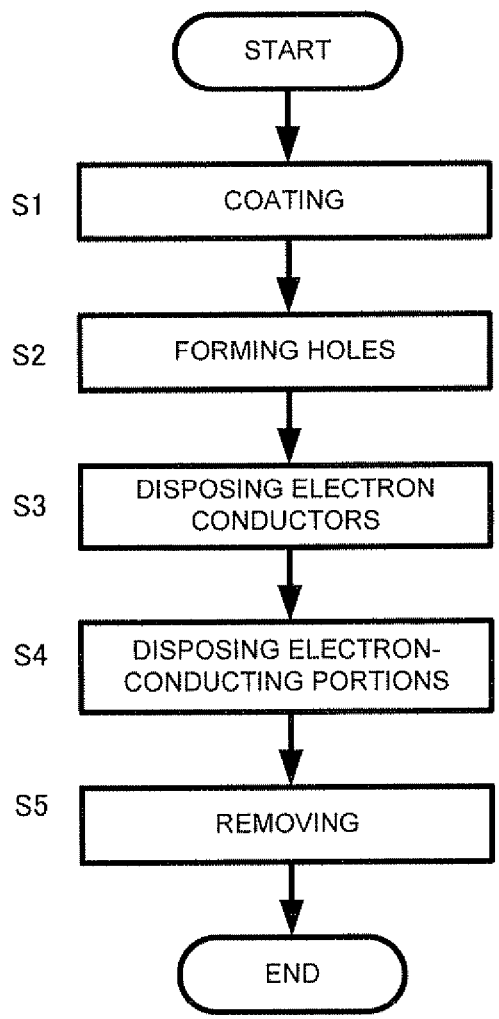
FIG. 3 is a flowchart illustrating a method for producing the current collector.

FIG. 3 is a flowchart illustrating a method for producing the current collector according to the invention. As shown in FIG. 3, the method for producing the current collector according to the invention has a coating step (S1), a step of forming holes (S2), a step of disposing electron conductors (S3), a step of disposing electron-conducting portions (S4), and a removing step (S5). Hereinafter, an example of the method for producing the current collector 1 will be described with reference to FIGS. 1 to 3.

The coating step (hereinafter, referred to as "S1") is a step of forming a plating resist layer in portions, in which the electron-conducting portions are not wanted to be disposed, on the surface of the insulating substrate 1a. The plating resist layer formed on a part of the surface of the insulating substrate 1a in S1 is not particularly limited as long as the plating resist layer is made of a material capable of coating the surface of the insulating substrate 1a until the electron-conducting portions are completely formed. S1 is not particularly limited as long as the plating resist layer can be formed in a part of the insulating substrate 1a in which the electron-conducting portions are not wanted to be disposed. For example, according to a known method, S1 may be a step of forming the plurality of plating resist layers at an interval, the step comprising: applying a material used to form the plating resist layer on the one entire face and the other entire face of the insulating substrate 1a formed of a polypropylene sheet with a thickness of 10 μm; irradiating light to the portions in which the electron-conducting portions are formed; varying the solubility; and then performing development.

The step of forming holes (hereinafter, referred to as "S2") is a step of forming holes 1b, 1b, . . . penetrating the insulating substrate 1a at portions of the insulating substrate 1a where the plating resist layers are not formed in S1. S2 is not particularly limited as long as the holes 1b, 1b, . . . can be formed at the portions where the electron-conducting portions are desired to be disposed. For example, S2 may be a step of forming the holes 1b, 1b, . . . at the portions of the insulating substrate 1a where the electron-conducting portions are desired to be disposed by punching press. The diameter of each holes 1b, 1b, . . . formed in S2 is not particularly limited as long as the electron conductor 1z can be disposed in the hole 1b. For example, the diameter is 10 μm. The interval of the adjacent holes 1b, 1b, . . . is not particularly limited; for example, the interval may be 100 μm or more and 500 μm or less. Here, S2 is performed after S1. However, the invention is not limited thereto. Forming the holes is not necessarily performed after the coating; the coating may be performed after forming the holes.

The step of disposing electron conductors (hereinafter, referred to as "S3") is a step of disposing the electron conductors 1z, 1z, . . . in the holes 1b, 1b, . . . formed in S2. S3 is not particularly limited as long as the electron conductors 1z, 1z, . . . can be disposed in the holes 1b, 1b, . . . . S3, for example, may be a step of placing metal Ni in the holes 1b, 1b, . . . by nonelectrolytic plating. When S3 is a step of placing metal Ni in the holes 1b, 1b, . . . by nonelectrolytic plating, the nonelectrolytic plating is not particularly limited. A known nonelectrolytic plating method can be appropriately used.

The step of disposing electron-conducting portions (hereinafter, referred to as "S4") is a step of: disposing the electron-conducting portions 1x, 1x, . . . on parts of one face of the insulating substrate 1a, in which the plating resist layer is not formed in S1, in a manner to contact with the electron conductors 1z, 1z, . . . disposed in the holes 1b, 1b, . . . in S3; and disposing the electron-conducting portions 1y, 1y, . . . on parts of the other face of the insulating substrate 1a, in which the plating resist layer is not formed in S1, in a manner to contact with the electron conductors 1z, 1z, . . . . S4 is not particularly limited as long as the electron-conducting portions 1x, 1x, . . . and the electron-conducting portions 1y, 1y, . . . can be formed in a manner to contact with the electron conductors 1z, 1z, . . . . S4 may be a step of forming the electron-conducting portions 1x, 1x, . . . and the electron-conducting portions 1y, 1y, . . . in the portions where the electron-conducting portions are desired to be disposed, by forming layers made of stainless steel (hereinafter, referred to as "SUS") in a manner to contact with the metal Ni disposed in the holes 1b, 1b, . . . by a known method such as a deposition method, a sputtering method, or a gas deposition method. The thickness of the electron-conducting portions 1x, 1x, . . . and the electron-conducting portions 1y, 1y, . . . formed in S4 is not particularly limited; for example, the thickness is 1 μm. In the invention, S4 may be a step of forming the electron-conducting portions simultaneously on the one face and the other face by, for example, plating.

The removing step (hereinafter, referred to as "S5") is a step of removing the plated resist layers formed in S1 after S4 ends. S5 is not particularly limited as long as the plated resist layers formed in S1 can be removed without removing the electron-conducting portions 1x, 1x, . . . and the electron-conducting portions 1y, 1y, . . . formed in S4. For example, S5 may be a step of removing the plated resist layers using a known processing liquid containing alkaline.

Thus, the current collector 1 is produced in accordance with the method for producing the current collector of the invention. As described above, the current collector 1 can improve the productivity and stability of the battery. Therefore, according to the invention, it is possible to provide the method for producing the current collector 1 capable of improving the productivity and stability of the battery.

In the above description regarding the method for producing the current collector, a method including S5 is shown. However, the invention is not limited to this method for producing the current collector. The method for producing the current collector according to the invention may not include S5.

In the above description of the current collector and the method for producing the same according to the invention, there has been described that the electron conductors 1z, 1z, . . . disposed in the holes 1b, 1b, . . . are made of the material different from the material of the electron-conducting portions 1x, 1x, . . . and the electron-conducting portions 1y, 1y, . . . disposed on the front and rear surfaces of the insulating substrate 1a. However, the invention is not limited thereto. In the invention, the electron conductors disposed in the holes penetrating the insulating substrate and the electron-conducting portions disposed on the front and rear faces of the insulating substrate may be made of the same material. When the electron conductors disposed in the holes and the electron-conducting portions disposed on the front and rear faces of the insulating substrate are made of the same material, the same material is, for example, SUS. In this case, a method of disposing SUS in the holes and on the front and rear faces of the insulating substrate is not particularly limited. In the invention, a known method can be used. For example, the holes are filled with SUS by a deposition method or a sputtering method and the electron-conducting portions are formed at an interval on the front and rear faces of the insulating substrate. Alternatively, the holes are filled with a SUS powder with an average grain diameter of several micrometers (for example, about 3 μm) by a gas deposition method and the electron-conducting portions are formed at an interval on the front and rear faces of the insulating substrate.

Figure 4:
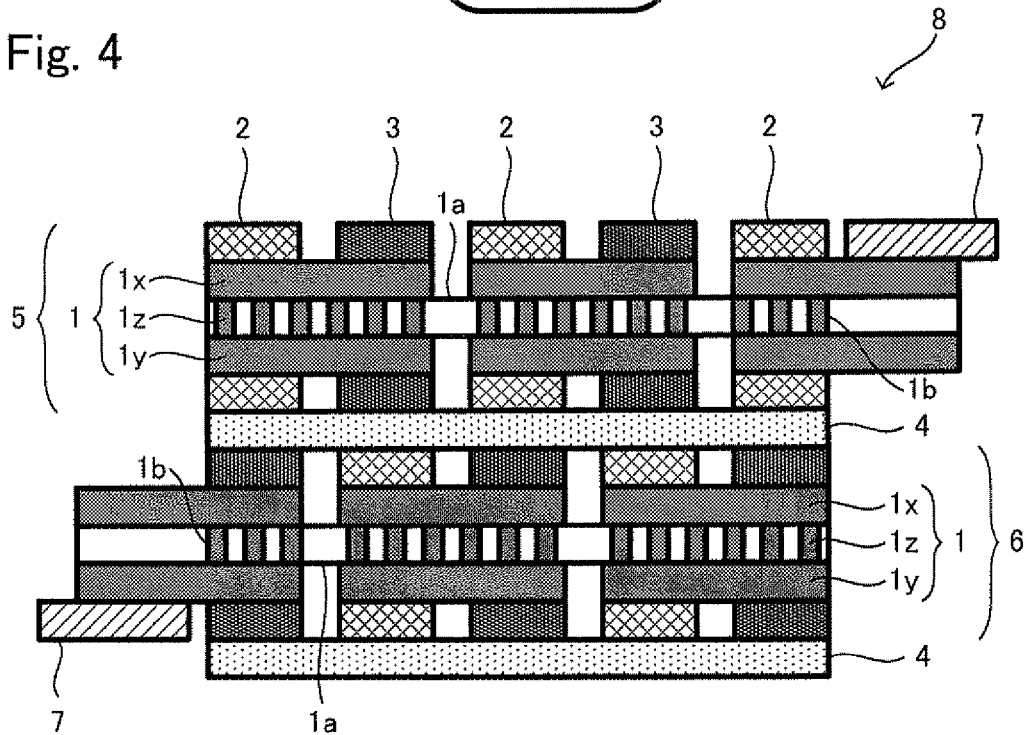
FIG. 4 is a cross-sectional view illustrating a stacked body 8.
Figure 5:
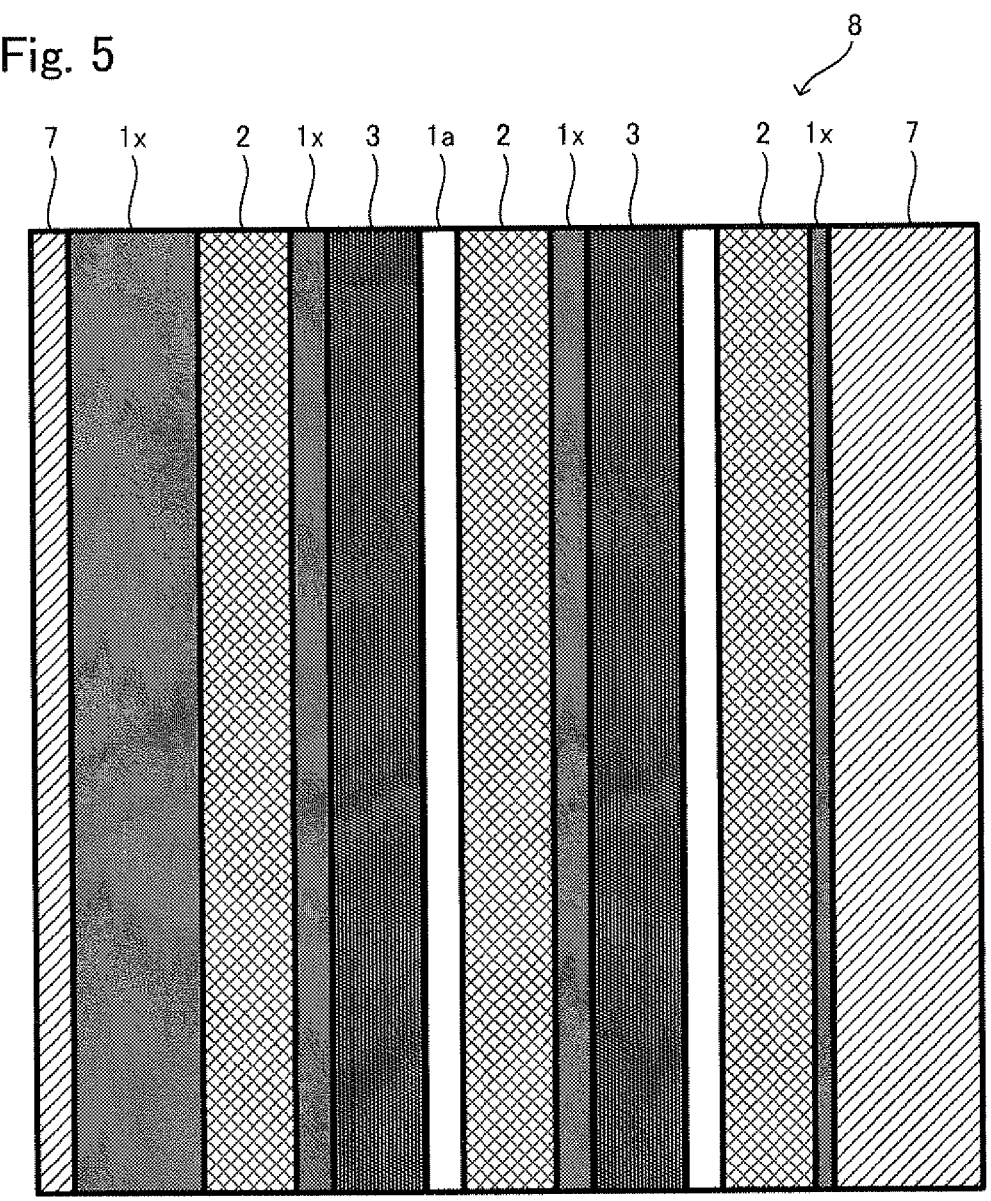
FIG. 5 is a front view illustrating the stacked body 8.
Figure 6:
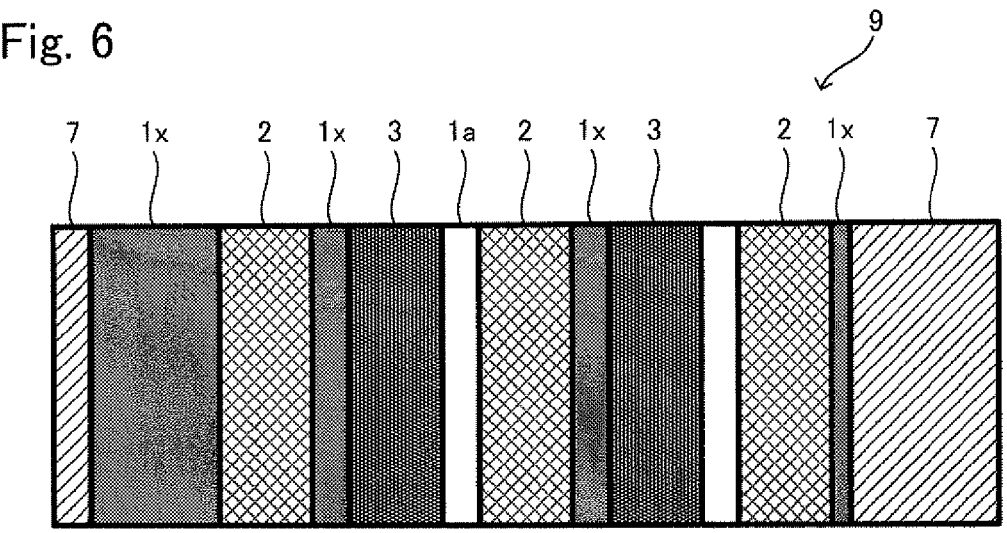
FIG. 6 is a front view illustrating a wound body 9.

FIG. 4 is a cross-sectional view illustrating a stacked body 8 in which the current collectors 1, electrodes (cathode layers 2 and anode layers 3), and electrolyte layers 4 are laminated. FIG. 5 is a front view illustrating the stacked body 8 shown in FIG. 4. FIG. 6 is a front view illustrating a wound body 9 of the battery according to the invention. The wound body 9 is produced by a procedure of winding the stacked body 8. In FIG. 6, the electrolyte layer 4 disposed in the outermost circumference is not illustrated.

The stacked body 8 comprises: an electrolyte layer 4, an electrode body 6, an electrolyte layer 4, and an electro body 5 alternately arranged in upper-and-lower direction in FIG. 4 (front/rear direction in FIG. 5). The electrode bodies 5 and 6 respectively have a current collector 1, cathode layers 2, 2, . . . , and anode layers 3, 3, . . . . In the electrode body 5 of the two electrode bodies 5 and 6 of the stacked body 8, a terminal 7 is connected to the electron-conducting portion 1x in the right end; in the electrode body 6, the terminal 7 is connected to the electron-conducting portion 1y in the left end. In the stacked body 8, the cathode layers 2, 2, . . . and/or the anode layers 3, 3, . . . come into contact with all of the electron-conducting portions 1x, 1x, . . . and the electron-conducting portions 1y, 1y, . . . . As for the cathode layers 2, 2, . . . and the anode layers 3, 3, . . . , a pair of cathode layers 2, 2, . . . or a pair of anode layers 3, 3, . . . are disposed to face each other via the current collector 1 and a pair of cathode layer 2 and anode layer 3 is disposed to face each other via the electrolyte layer 4 disposed between the two electrode bodies 5 and 6. In the stacked body 8, the cathode layers 2, 2, . . . and the anode layers 3, 3, . . . come into contact with the electron-conducting portion 1x, the electron-conducting portion 1y, and the electrolyte layer 4, and do not come into contact with the insulating substrate 1a.

For example, the wound body 9 is produced by winding the stacked body 8 so that the rear side in FIG. 5 is formed in a protuberant manner. In the wound body 9, single batteries including a pair of cathode layers 2, 2, . . . , the electrolyte layer 4, and the anode layer 3 are connected to each other in parallel in the upper-and-lower direction in FIG. 4 and are connected to each other in series in the right and left directions in FIG. 4.

The wound body 9 of the battery according to the invention has the current collectors 1, 1. The electron-conducting portions 1x, 1x, ... formed on one face of the current collectors 1, 1 come into contact with the plurality of electrodes (the cathode layers 2, ... and the anode layers 3, ... ; below, it is the same in the description of the current collector 1) except for the electron-conducting portion 1x disposed in the right end in FIG. 4. The electron-conducting portions 1y, 1y, ... disposed on the other face of the current collectors 1, 1, ... also come into contact with the plurality of electrodes except for the electron-conducting portion 1y disposed in the left end in FIG. 4. Thus, when the battery including the wound body 9 is produced, the plurality of electrodes and the electron-conducting portions 1x, 1x, ... or the electron-conducting portions 1y, 1y, ... can be brought into contact with each other at once, thereby improving the productivity of the battery including the wound body 9. Moreover, since the electron-conducting portions 1x, 1x, ... and the electron-conducting portions 1y, 1y, ... are formed in the planar direction at an interval, short circuit between the electrodes separated from each other in the planar direction by the insulating substrate 1a can be prevented due to the insulating substrate 1a present between the electron-conducting portions 1x, 1x, ... and the electron-conducting portions 1y, 1y, .... Therefore, according to the configuration of the wound body 9 of the invention, it is possible to provide the battery capable of improving the productivity and stability.

Figure 7:
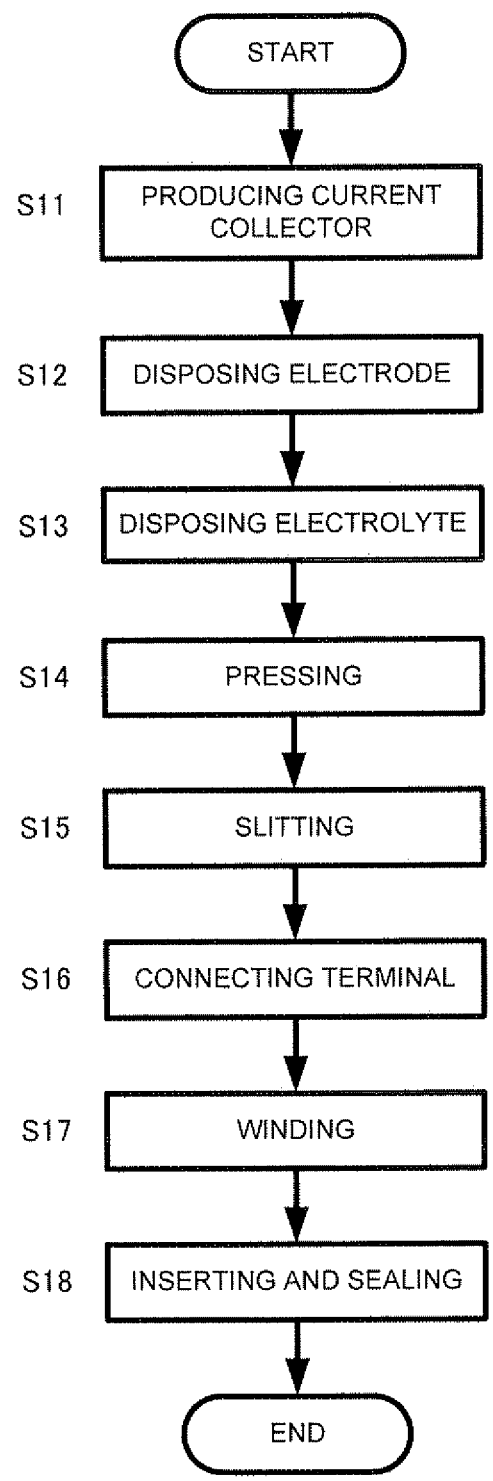
FIG. 7 is a flowchart illustrating a method for producing a battery.
Figure 8:
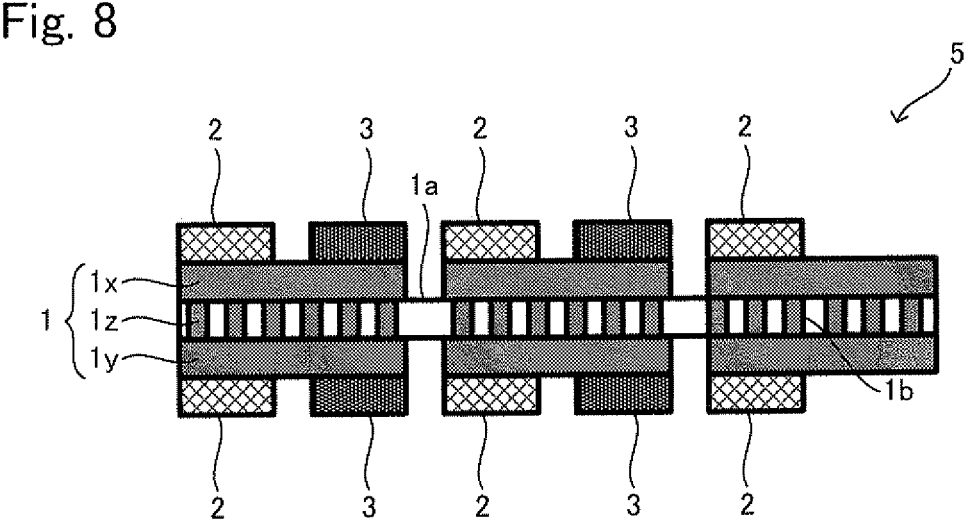
FIG. 8 is a cross-sectional view illustrating an electrode body 5.
Figure 9:
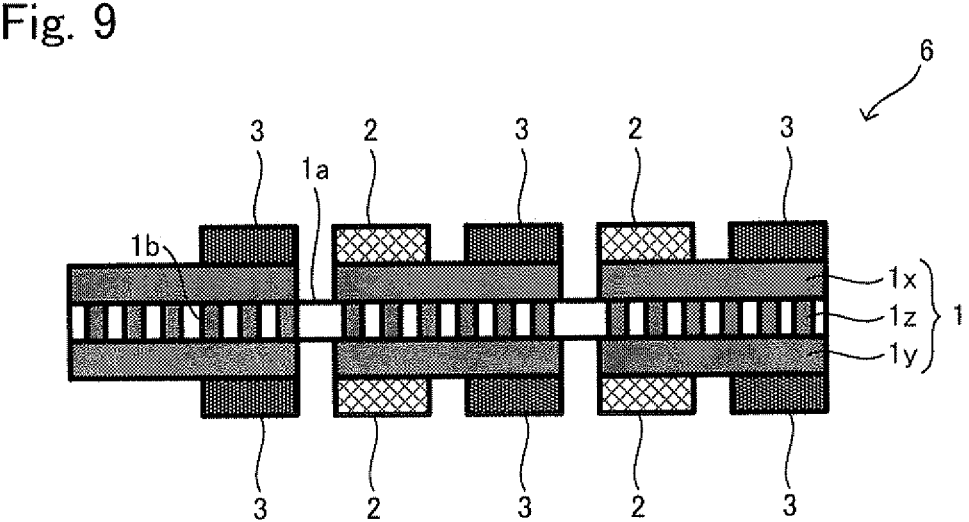
FIG. 9 is a cross-sectional view illustrating an electrode body 6.
Figure 10:
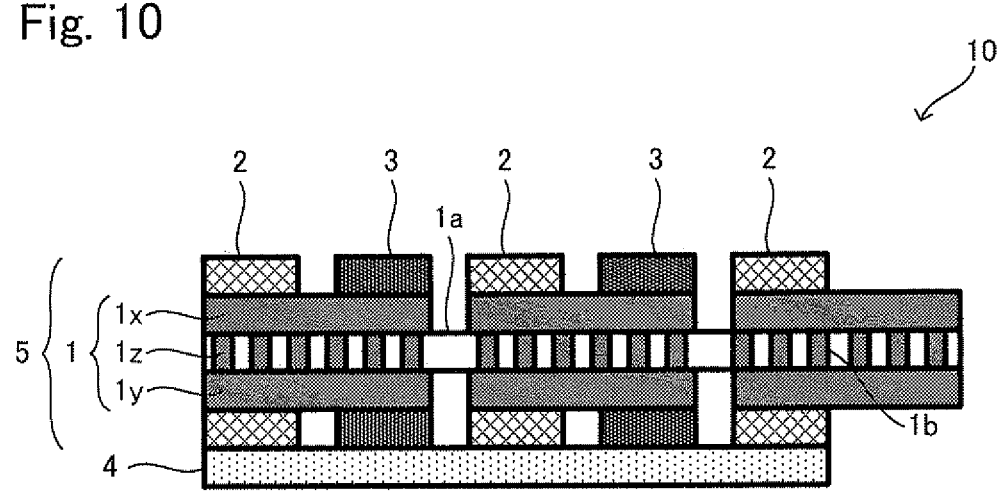
FIG. 10 is a cross-sectional view illustrating a structure 10.
Figure 11:
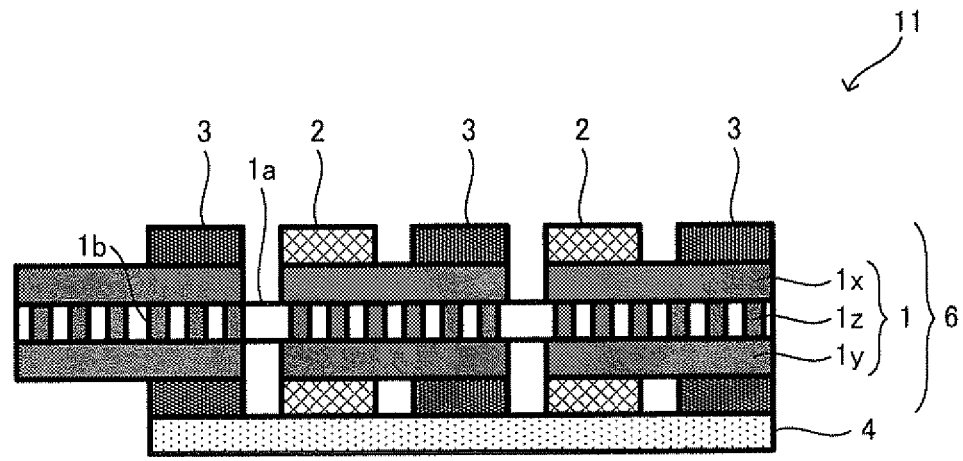
FIG. 11 is a cross-sectional view illustrating a structure 11.
Figure 12:
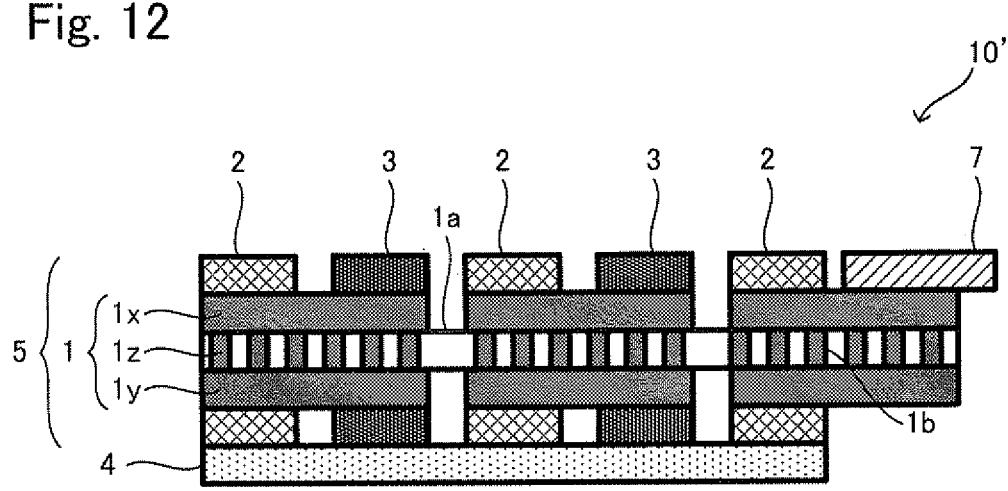
FIG. 12 is a cross-sectional view illustrating a structure 10'.
Figure 13:
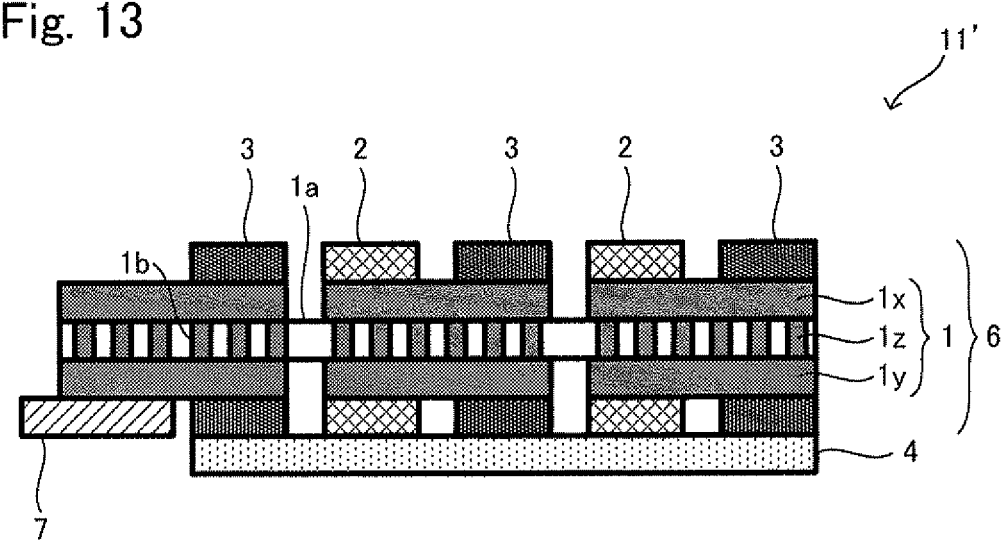
FIG. 13 is a cross-sectional view illustrating a structure 11'.
Figure 14:
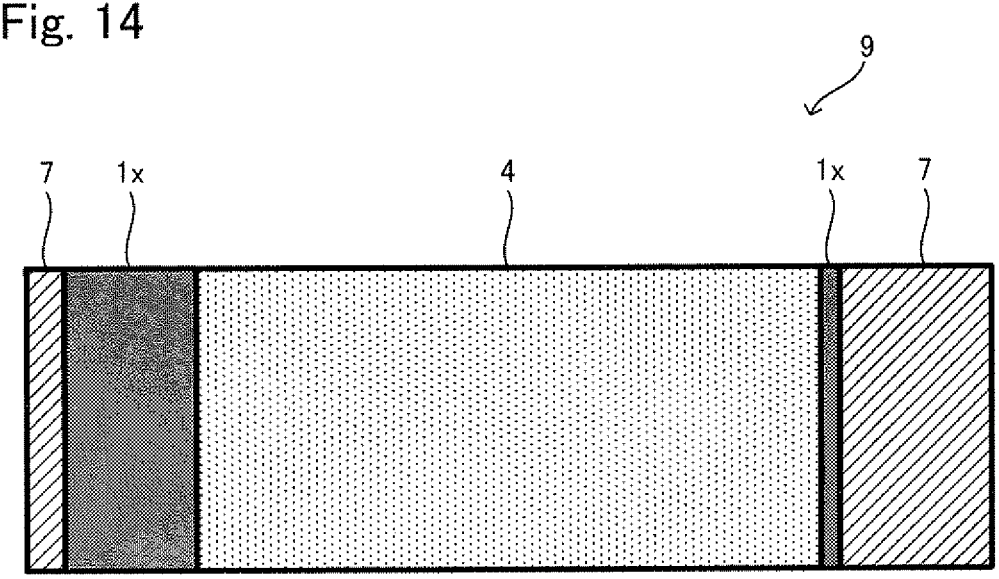
FIG. 14 is a front view illustrating a wound body 9.

FIG. 7 is a flowchart illustrating a method for producing the battery according to the invention. As shown in FIG. 7, the method for producing the battery according to the invention includes: a step of producing the current collector (S11), a step of disposing the electrodes (S12), a step of disposing the electrolyte layer (S13), a pressing step (S14), a slitting step (S15), a step of connecting terminals (S16), a winding step (S17), and an insertion sealing step (S18). FIGS. 8 to 14 are diagrams illustrating steps of producing the battery including the wound body 8 according to the invention. FIG. 8 is a cross-sectional view illustrating the electrode body 5 produced in the step of disposing the electrodes. FIG. 9 is a cross-sectional view illustrating the electrode body 6 produced in the step of disposing the electrodes. FIG. 10 is a cross-sectional view illustrating a structure 10 including the electrolyte layer 4 and the electrode body 5. FIG. 11 is a cross-sectional view illustrating a structure 11 including the electrolyte layer 4 and the electrode body 6. FIG. 12 is a cross-sectional view illustrating a structure 10' to which the terminal 7 is connected in the step of connecting the terminals. FIG. 13 is a cross-sectional view illustrating a structure 11' to which the terminal 7 is connected in the step of connecting the terminals. FIG. 14 is a front view illustrating the wound body 9 produced in the winding step. Hereinafter, an example of the method for producing the battery according to the invention will be described with reference to FIGS. 4 to 14.

The step of producing the current collector (hereinafter, referred to as "S11") is a step of producing the current collector 1. More specifically, S11 is a step of producing the current collector 1 in accordance with S1 to S5.

The step of disposing the electrodes (hereinafter, referred to as "S12") is a step of producing the electrode body 5 shown in FIG. 8 and the electrode body 6 shown in FIG. 9 by disposing the cathode layers 2, 2, ... and the anode layers 3, 3, ... in a manner to contact with the electron-conducting portions 1x, 1x, ... or the electron-conducting portions 1y, 1y, ... of the current collector 1 produced in S11. S12 is not particularly limited as long as the cathode layers 2, 2, ... and the anode layers 3, 3, ... can be disposed in a manner to contact with the electron-conducting portions 1x, 1x, ... or the electron-conducting portions 1y, 1y, .... In S12, for example, the cathode layers 2, 2, ... and the anode layers 3, 3, ... can be formed at once on one face of the current collector 1 by alternately coating and drying a cathode composition and a anode composition at an interval on the face of the electron-conducting portions 1x, 1x, ... by a die coating method. Thereafter, a cathode composition and a anode composition are alternately coated and dried on the face of all of the electron-conducting portions 1y, 1y, ... by a die coating method so that a pair of cathode layers 2, 2, ... or a pair of anode layers 3, 3, ... face each other with the current collector 1 interposed therebetween. Thus, since the cathode layers 2, 2, ... and the anode layers 3, 3, ... can be formed at once on one face and the other face of the current collector 1 by the above steps, the electrode bodies 5 and 6 can easily be produced.

The cathode composition coated on the surfaces of the electron-conducting portions 1x, 1x, ... or the electron-conducting portions 1y, 1y, ... in S12 is not particularly limited as long as the cathode composition is used for producing the cathodes of the battery. In S12, for example, a composition, which is produced by mixing a solvent with a mixture of, positive active material:electrolyte:conductive aid:binder=45:45:9:1 (at a mass ratio), may be used as the cathode composition. In S12, example of the positive active material may be lithium cobaltrate. Example of the electrolyte may be: a sulfide solid electrolyte produced by mixing $Li_2S$ and $P_2S_5$ at a mass ratio of $Li_2S:P_2S_5$=50:50 to 100:0; and a known organic solid electrolyte. In S12, example of the conductive aid may be acetylene black. Example of the binder may be polyvinylidene fluoride (PVDF). In S12, the width of the cathodes 2 formed on the surface of the electron-conducting portions 1x, 1x, ... or the electron-conducting portions 1y, 1y, ... may be, for example, 50 mm. The thickness of the cathode layer 2 of the wound body 8 may be set to, for example, 30 μm.

The anode composition coated on the surfaces of the electron-conducting portions 1x, 1x, ... or the electron-conducting portions 1y, 1y, ... in S12 is not particularly limited as long as the anode composition is used for producing the anodes of the battery. In S12, for example, a composition, which is produced by mixing a solvent with a mixture of negative active material:electrolyte:conductive aid:binder=47:47:5:1 (at a mass ratio), may be used as the anode composition. In S12, example of the negative active material may be graphite carbon. Example of the electrolyte may be a sulfide solid electrolyte produced by mixing $Li_2S$ and $P_2S_5$ at a mass ratio of $Li_2S:P_2S_5$=50:50 to 100:0; and a known organic solid electrolyte. Example of the conductive aid may be acetylene black. Example of the binder may be polyvinylidene fluoride (PVDF). In S12, the width of the anodes 3 formed on the surface of the electron-conducting portions 1x, 1x, ... or the electron-conducting portions 1y, 1y, ... may be, for example, 52 mm. The thickness of the anode layer 3 of the wound body 8 may be set to, for example, 35 μm.

The step of disposing the electrolyte layer (hereinafter, referred to as "S13") is a step of disposing the electrolyte layer 4 in a manner to cover the cathode layers 2, 2, ... and the anode layers 3, 3, ... disposed on one side of the electrode body 5 produced in S12 and disposing the electrolyte layer 4 in a manner to cover the cathode layers 2, 2, ... and the anode layers 3, 3, ... disposed on one side of the electrode body 6 produced in S12. S13 is not particularly limited as long as the electrolyte layers 4, 4 can be disposed so that all the cathode layers 2, 2, . . . and the anode layers 3, 3, . . . disposed on one side of the electrode bodies 5 and 6 come into contact with the electrolyte layers 4. S13 may be a step of disposing the electrolyte layers 4, 4 respectively by coating and drying an electrolytic composition to cover the cathode layers 2, 2, . . . and the anode layers 3, 3, . . . disposed on one side of the electrode bodies 5 and 6 by gravure printing method.

The electrolytic composition coated on the surfaces of the cathode layers 2, 2, . . . and the anode layers 3, 3, . . . in S13 is not particularly limited as long as the electrolytic composition can be used for producing the electrolyte layer of the battery. In S13, for example, a composition, which is produced by mixing a solvent with a mixture of electrolyte: binder=99:1 (at a mass ratio), may be used as the electrolytic composition. In S13, for example, a sulfide solid electrolyte produced by mixing $Li_2S$ and $P_2S_5$ at a mass ratio of $Li_2S:P_2S_5$=50:50 to 100:0 and a known organic solid electrolyte may be used as the electrolyte. Example of the binder may be polyvinylidene fluoride (PVDF). The thickness of the electrolyte layers 4 of the wound body 8 may be set to, for example, 20 μm.

The pressing step (hereinafter, referred to as "S14") is a step of pressing the electrode bodies 5 and 6 in which the electrolyte layer 4 has been disposed in S13. S14 may be a step performed for the cathode active material and the electrolyte and for the anode active material and the electrolyte to produce the battery of which energy density and output density are improved by expanding the contact area between the electrolytes. For example, this step may be a step of pressing the electrode body 5 in which the electrolyte layer 4 has been disposed and the electrode body 6 in which the electrolyte layer 4 has been disposed by roll pressing.

The slitting step (hereinafter, referred to as "S15") is a step of removing a part of the cathode layers 2, 2, . . . and/or the anode layers 3, 3, . . . protruding towards the uncoated portions, where the cathode composition or the anode composition are not wanted to be coated in terms of design, in the cathode layers 2, 2, . . . or the anode layers 3, 3, . . . of the electrode bodies 5 and 6, respectively, which are pressed in S14 and are placed on the electrolyte layer 4. For example, S15 may be a step of producing the structure 10 shown in FIG. 10 and the structure 11 shown in FIG. 11 by a shear cut-type slitter by removing a part of the current collectors 7, 7 . . . in which the electrodes are not coated.

The step of connecting terminals (hereinafter, referred to as "S16") is a step of producing the structure 10' shown in FIG. 12 and the structure 11' shown in FIG. 13 by connecting the terminal 7 to the electron-conducting portion of the structure 10 and the structure 11, in which the uncoated portions are defined in S15. For example, S16 may be a step of producing the structure 10' and the structure 11' by welding a Ni lead terminal 7 to the right-end electron-conducting portion 1x of the structure 10, welding a Ni lead terminal 7 to the left end electron-conducting portion 1y of the structure 11, and attaching an insulation tape (not shown) to the surfaces of the Ni lead terminals 7, 7, . . . for circuit protection.

The winding step (hereinafter, referred to as "S17") is a step of producing the stacked body 8 by laminating the structure bodies 10' and 11' produced in S16, and then producing the wound body 9 shown in FIG. 14 by winding the stacked body 8. For example, S17 may be a step of producing the wound body 9 comprising the steps of producing the stacked body 8 by laminating the structure bodies 10' and 11' so that the cathode layers 2, 2, . . . of the structure 10' and the anode layers 3, 3, . . . of the structure 11' face each other with the electrolyte layer 4 interposed therebetween and the negative layers 3, 3, . . . of the structure 10' and the cathode layers 2, 2, . . . of the structure 11' face each other with the electrolyte layer 4 interposed therebetween; and then producing the wound body 9 by winding the stacked body 8 in a cylindrical shape.

The insertion sealing step (hereinafter, referred to as "S18") is a step of producing the battery including the wound body 9 by inserting and sealing the wound body 9 produced in S17 into a case. For example, S18 may be a step of producing the battery including the wound body 9 by welding the terminals 7, 7, . . . of the wound body 9 produced in S17 to the case, inserting the wound body 9 into the cylindrical case, and then sealing the case accommodating the wound body 9.

In this way, according to the method for producing the battery of the invention, it is possible to produce the battery including the wound body 9. As described above, by providing the wound body 9, the productivity or stability of the battery can be improved. Therefore, according to the invention, it is possible to provide the method for producing the battery capable of improving the productivity and stability.

In the above description of the battery and the producing method therefor according to the invention, there are provided the electrode bodies 5 and 6 disposed so that a pair of cathode layers 2, 2, . . . and a pair of anode layers 3, 3, . . . face each other with the current collector 1 interposed therebetween. However, the invention is not limited to these modes. Hereinafter, a case will be described in which a battery according to the invention includes an electrode body disposed so that a cathode layer 2 and a anode layer 3 face each other with the current collector 1 interposed therebetween. Moreover, a method for producing the battery will be described.

Figure 15:
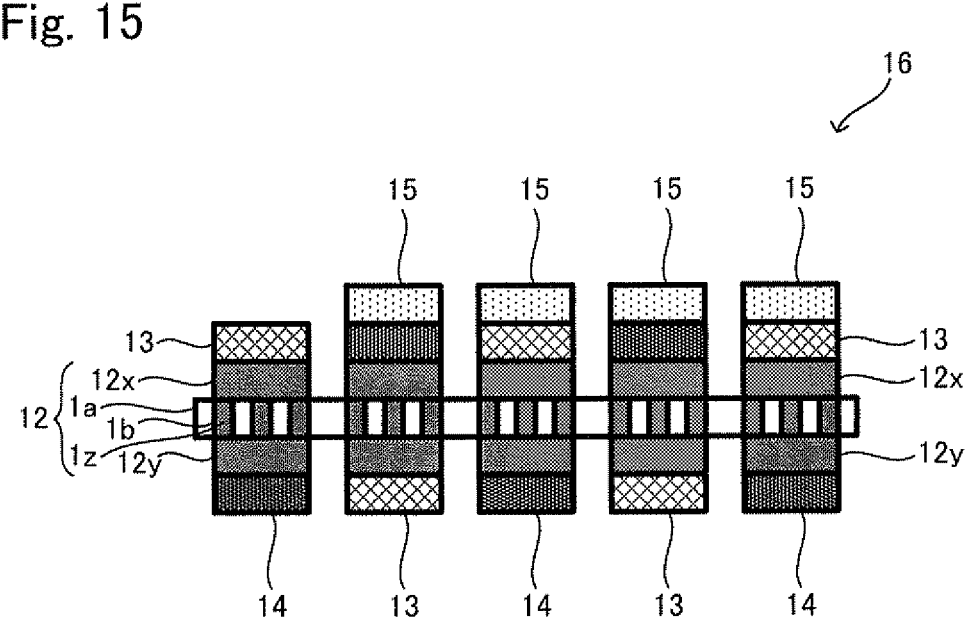
FIG. 15 is a cross-sectional view illustrating a stacked body 16.
Figure 16:
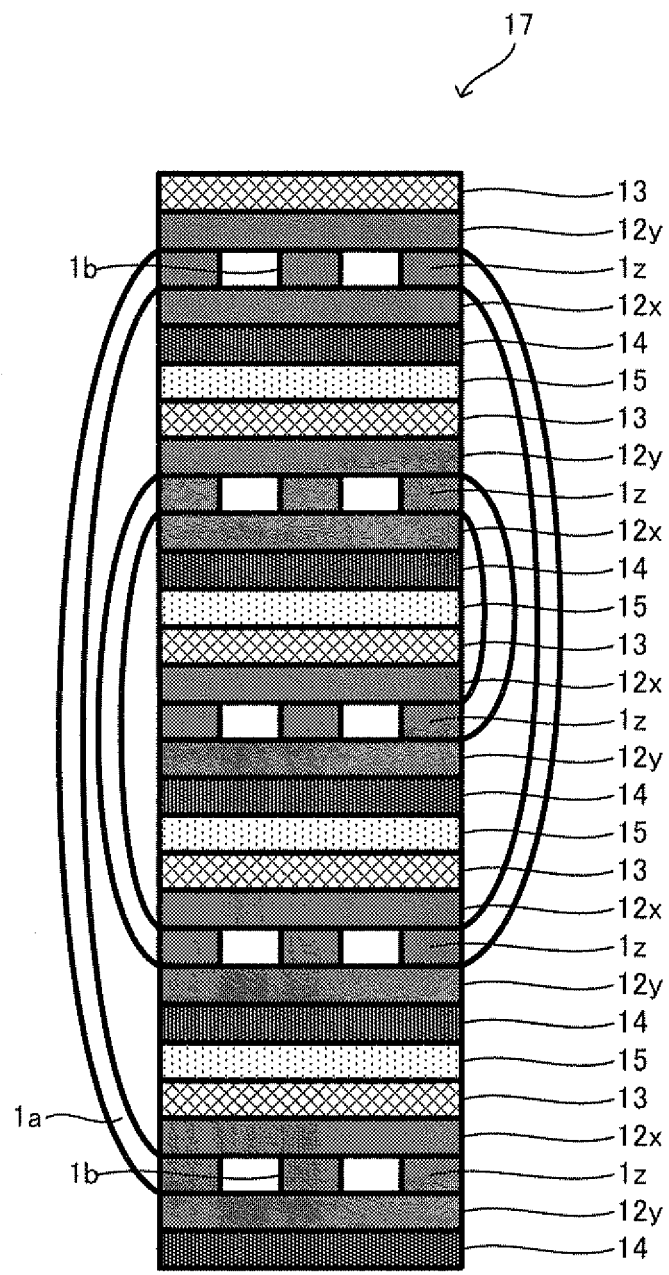
FIG. 16 is a cross-sectional view illustrating a wound body 17.

FIG. 15 is a cross-sectional view illustrating a stacked body 16 including: a current collector 12 according to the invention; electrodes (cathode layers 13 and anode layers 14); and electrolyte layers 15, which are laminated. FIG. 16 is a cross-sectional view simply illustrating a wound body 17 produced by winding the stacked body 16. The current collector 12 is different from the current collector 1 in terms of the width of electronic conducive members 12x, 12x, . . . and electronic conducive members 12y, 12y, . . . in the planar direction (right and left directions in FIG. 15; below, it is the same in the descriptions of the current collector 12, the cathode layer 13, and the anode layer 14), and the current collector 12 is the same as the current collector 1 in terms of the constituent material and the producing method. The cathode layer 13 is different from the cathode layer 2 in terms of the length in the rear/front direction in FIGS. 15 and 16 and is the same as the cathode layer 2 in terms of the constituent material. The anode layer 14 is different from the anode layer 3 in terms of the length in the rear/front direction in FIGS. 15 and 16 and is the same as the anode layer 3 in terms of the constituent material. The electrolyte layer 15 is different from the electrolyte layer 4 in terms of the length in the right and left directions in FIGS. 15 and 16 and is the same as the electrolyte layer 4 in terms of the constituent material. In FIGS. 15 and 16, the same reference numerals as those used in FIGS. 1 to 14 are given to the same elements constituted in the same manner as the current collector 1, and the description thereof will not be repeated.

The stacked body 16 has the current collector 12, the cathode layers 13, 13, . . . , the anode layers 14, 14, . . . , and the electrolyte layers 15, 15, . . . . The current collector 12 has an insulating substrate 1a, electron-conducting portions 12x, 12x, . . . disposed in the planar direction at an interval on one face of the insulating substrate 1a, and electron-conducting portions 12y, 12y, . . . disposed in the planar direction at an interval on the other face of the insulating substrate 1a. The insulating substrate 1a includes the plurality of holes 1b, 1b, . . . . The electron-conducting portions 12x, 12x, . . . and the electron-conducting portions 12y, 12y, . . . facing each other with the current collector 12 interposed therebetween are connected to each other via the electron conductors 1z, 1z, . . . disposed in the holes 1b, 1b, . . . . The cathode layers 13, 13, . . . or the anode layers 14, 14, . . . are alternately disposed in the planar direction on the surfaces of the electron-conducting portions 12x, 12x, . . . and the electron-conducting portions 12y, 12y, . . . . The electrolyte layers 15, 15, . . . are disposed on the surfaces of the cathode layers 13, 13, . . . and the anode layers 14, 14, . . . disposed on one face of the current collector 12. The cathode layer 13 disposed on the surface of the electron-conducting portion 12x faces the anode layer 14 disposed on the surface of the electron-conducting portion 12y with the current collector 12 interposed therebetween. The anode layer 14 disposed on the surface of the electron-conducting portion 12x faces the cathode layer 13 disposed on the surface of the electron-conducting portion 12y with the current collector 12 interposed therebetween. In the stacked body 16, the cathode layers 13, 13, . . . and the anode layers 14, 14, . . . come into contact with the electron-conducting portion 12x and the electrolyte layer 15, or the electron-conducting portion 12y, but do not contact with the insulating substrate 1a.

The wound body 17 is produced by winding the cathode layers 13 . . . of the stacked body 16 in a manner to face the anode layers 14 . . . with the electrolyte layers 15 . . . interposed therebetween. In the wound body 17, single batteries including a pair of cathode layers 13 . . . , the electrolyte layer 15, and the anode layer 14 are connected to each other in series in the upper-and-lower direction in FIG. 16.

As shown in FIG. 16, the wound body 17 of the battery according to the invention has the current collectors 12 according to the invention. The electron-conducting portions 12x, 12x, . . . formed on one face of the current collectors 12 respectively come into contact with the cathode layers 13 . . . or the anode layers 14 . . . . The electron-conducting portions 12y, 12y, . . . formed on the other face of the current collectors 12 respectively come into contact with the cathode layers 13 . . . or the anode layers 14 . . . . Thus, when the wound body 17 is produced, the plurality of electrodes and the electron-conducting portions 12x, 12x, . . . or the electron-conducting portions 12y, 12y, . . . can come into contact with each other at once, thereby improving the productivity of the battery including the wound body 17. Moreover, since the electron-conducting portions 12x, 12x, . . . and the electron-conducting portions 12y, 12y, . . . are formed in the planar direction at an interval, short circuit between the electrodes separated from each other in the planar direction by the insulating substrate 1a can be prevented due to the insulating substrate 1a present between the electron-conducting portions 12x, 12x, . . . and the electron-conducting portions 12y, 12y, . . . . Therefore, according to the configuration of the wound body 17 of the invention, it is possible to provide the battery capable of improving the productivity or stability.

According to the wound body 17, the number of single batteries connected to each other in series can be easily increased by lengthening the length the wound stacked body 16 in a wound direction (right and left directions in FIG. 15); thereby it is possible to provide the battery of which voltage design can be easily implemented. As for the wound body 17, the electrode layers and the electrolyte layers 15, 15, . . . are not disposed in the left end and right end (hereinafter, referred to as "curved portions") of the curved wound body 17. With such a configuration, not only the electrode layers or the electrolyte layers can be prevented from being separated from the curved portions when the battery including the wound body 17 is produced or used, but also the volume of the curved portions which do not contribute to power generation can be reduced, thereby improving the energy density or the output density of the battery including the wound body 17. Moreover, since the winding mechanism of the wound body 17 is simple, the production speed can be made faster.

Figure 17:
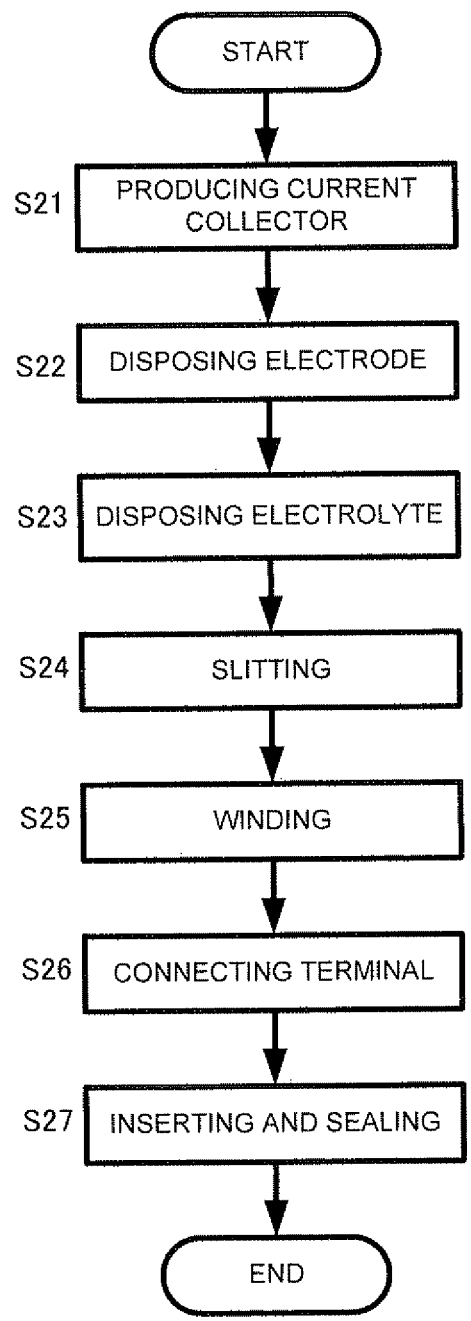
FIG. 17 is a flowchart illustrating a method for producing a battery.
Figure 18:
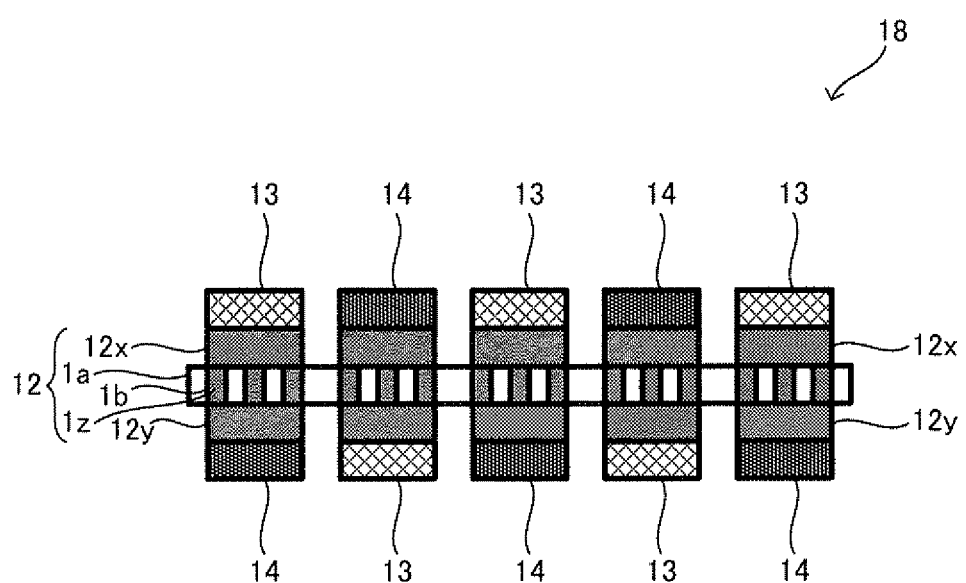
FIG. 18 is a cross-sectional view illustrating an electrode body 18.
Figure 19:
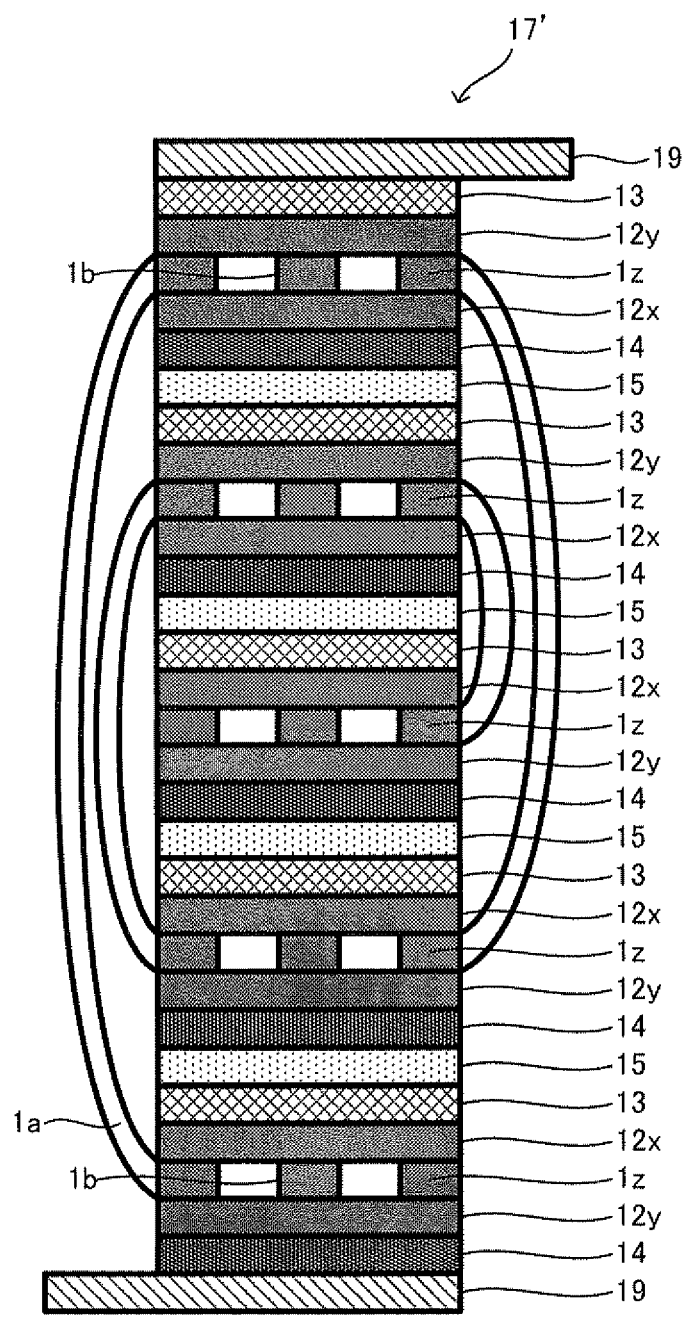
FIG. 19 is a cross-sectional view illustrating a wound body 17'.

FIG. 17 is a flowchart illustrating a method for producing the battery according to the invention. As shown in FIG. 17, the method for producing the battery according to the invention includes: a step of producing the current collector (S21), a step of disposing the electrodes (S22), a step of disposing the electrolyte layers (S23), a slitting step (S24), a winding step (S25), a step of connecting terminals (S26), and an insertion sealing step (S27). FIGS. 18 and 19 are diagrams illustrating steps of producing the battery according to the invention. FIG. 18 is a cross-sectional view illustrating an electrode body 18 produced in the step of disposing the electrodes. FIG. 19 is a cross-sectional view illustrating a wound body 17' to which terminals 19, 19, . . . are connected in the step of connecting the terminals. Hereinafter, an example of the method for producing the battery according to the invention will be described with reference to FIGS. 15 to 19.

The step of producing the current collector (hereinafter, referred to as "S21") is a step of producing the current collector 12. More specifically, S21 is a step of producing the current collector 12 in accordance with S1 to S5.

The step of disposing the electrodes (hereinafter, referred to as "S22") is a step of producing the electrode body 18 shown in FIG. 18 by disposing the cathode layers 13, 13, . . . and the anode layers 14, 14, . . . in a manner to contact with the electron-conducting portions 12x, 12x, . . . or the electron-conducting portions 12y, 12y, . . . of the current collector 12 produced in S21. S22 is not particularly limited as long as the cathode layers 13, 13, . . . and the anode layers 14, 14, . . . can be disposed in a manner to contact with the electron-conducting portions 12x, 12x, . . . or the electron-conducting portions 12y, 12y, . . . . In S22, for example, the cathode layers 13, 13, . . . and the anode layers 14, 14, . . . are formed at once on one face of the current collector 12, by alternately coating and drying a cathode composition and a anode composition at an interval on the surfaces of the electron-conducting portions 12x, 12x, . . . by a gravure printing method. Thereafter, a cathode composition and an anode composition are alternately coated and dried on the surfaces of all of the electron-conducting portions 12y, 12y, . . . by a gravure printing method so that the cathode layer 13 and the anodes layer 14 face each other with the current collector 12 interposed therebetween. Thus, since the cathode layers 13, 13, . . . and the anode layers 14, 14, . . . can be formed at once on one face and the other face of the current collector 12 by the above steps, the electrode body 18 may easily be produced.

In S22, the size of the cathode layer 13 formed on the surface of the electron-conducting portions 12x, 12x, . . . or the electron-conducting portions 12y, 12y, . . . may be, for example, 50 mm×50 mm. The thickness of the cathode layer 13 of the wound body 17 may be set to, for example, 30 μm. In S22, the size of the anode layer 14 formed on the surface of the electron-conducting portions 12x, 12x, . . . or the electron-conducting portions 12y, 12y, . . . may be, for example, 52 mm×52 mm. The thickness of the anode layer 14, 14, . . . of the wound body 17 may be set to, for example, 35 μm.

The step of disposing the electrolyte layer (hereinafter, referred to as "S23") is a step of disposing the electrolyte layers 15, 15, . . . only on the surfaces of the cathode layers 13, 13, . . . and the anode layers 14, 14, . . . disposed on one side of the electrode body 18 produced in S22. S23 is not particularly limited as long as the electrolyte layers 15, 15, ... can be disposed only on the surfaces of the cathode layers 13, 13, ... and the anode layers 14, 14, ... disposed on one side of the electrode body 18. S23, for example, may be a step of producing the stacked body 16 shown in FIG. 15 by coating and drying an electrolytic composition on the surfaces the cathode layers 13, 13, ... and the anode layers 14, 14, ... disposed on the side of the electrode body 18 and disposing the electrolyte layers 15, 15, ... by a gravure printing method.

The slitting step (hereinafter, referred to as "S24") is a step of shortening the length (length in the rear/front direction in FIG. 15) of the stacked body 16 in the depth direction.

The winding step (hereinafter, referred to as "S25") is a step of producing the stacked body 17 shown in FIG. 16 by folding and winding the insulating substrate 1a of the uncoated portions in the stacked body 16 arranged in the length in the depth direction in S24. For example, S25 may be a step of producing the wound body 17 by folding and winding the insulating substrate 1a of the uncoated portions so that the cathode layer 13 and the anode layer 14 face each other with the electrolyte layer 15 interposed therebetween. In the wound body 17 produced through S25, it is desirable that the right end surfaces and the left end surfaces of the cathode layer 13 and the anode layer 14 facing each other with the electrolyte layer 15 interposed therebetween are all aligned at position in FIG. 16. The wound body 17 with such a configuration can be produced in a state where the length thereof is allowed to be same as the length of the uncoated portions located in the outermost circumference of the wound body 17.

The step of connecting terminals (hereinafter, referred to as "S26") is a step of connecting the terminals 19, 19 to the electron-conducting portions 12y, 12y, ... of the wound body 17 produced in S25. S26 is not particularly limited as long as the terminal 19 can be connected to the electron-conducting portion 12y coming into contact with the cathode layer 13 disposed in one end of the single battery in a stacked direction and the terminal 19 can be connected to the electron-conducting portion 12y coming into contact with the anode layer 14 disposed in the other end of the single battery in the stacked direction. For example, S26 may be a step of producing the wound body 17' shown in FIG. 19 by disposing the terminals 19, 19, ... formed of a stainless steel foil having a size of 53 mm×80 mm and an unevenness on the surface thereof in the upper and lower ends of the wound body 17, perforating the cathode layer 13 disposed in the upper end of the wound body 17 and connecting the terminal 19 to the electron-conducting portion 12y, and perforating the anode layer 14 disposed in the lower end of the wound body 17 and connecting the terminal 19 to the electron-conducting portion 12y.

The insertion sealing step (hereinafter, referred to as "S27") is a step of producing the battery including the wound body 17' by inserting and sealing the wound body 17' produced in S26 into a case. For example, S27 may be a step of producing the battery including the wound body 17' by welding the terminals 19, 19, ... of the wound body 17' produced in S26 to the case, inserting the wound body 17' into the case, and then laminating and sealing the case accommodating the wound body 17'.

In this way, according to the method for producing the battery of the invention, it is possible to produce the battery including the current collector 12. As described above, by providing the current collector 12, the productivity or stability of the battery can be improved. Therefore, according to the invention, it is possible to provide the method for producing the battery capable of improving the productivity and stability.

In the above description of the method for producing the battery including the wound body 17' according to the invention, there has been described as an example of S26 that the terminals 19, 19 formed of the stainless steel foil having the unevenness on the surface thereof are disposed in the upper and lower ends of the wound body 17, the cathode layer 13 or the anode layer 14 are perforated by the unevenness of the terminals 19, 19, and then, the terminals 19, 19 are connected to the electron-conducting portions 12y, 12y. However, the invention is not limited to the step of connecting the terminals in the method for producing the battery including the wound current collector 12 according to the invention. The step of connecting the terminal may include: removing the cathode layer 13 disposed in the upper end of the wound body 17 and the anode layer 14 disposed in the lower end of the same; and connecting known lead terminals to each of the electron-conducting portion 12y which had been contacted with the removed cathode layer 13 and the electron-conducting portion 12y which had been contacted with the removed anode layer 14, respectively. The step may otherwise include bringing exterior materials also functioning as a terminal into contact directly with the electron-conducting portion 12y which had been contacted with the removed cathode layer 13 and the electron-conducting portion 12y which had been contacted with the removed anode layer 14, respectively.

In the above description of the battery including the wound body 17' and the method for producing the battery according to the invention, a configuration where the electrolyte layers 15, 15, ... are disposed only on the surfaces of the cathode layers 13, 13, ... and the anode layers 14, 14, ... disposed on one face of the current collector 12 has been described; however, the invention is not limited thereto. The electrolyte layers 15, 15, ... may even be disposed between the cathode layers 13, 13, ... and the anode layers 14, 14, ... disposed on one face of the current collector 12. So as to provide a battery easily improving the energy density or the output density, it is desirable that the electrolyte layers 15, 15, ... are disposed only on the surfaces of the cathode layers 13, 13, ... and the anode layers 14, 14, ... disposed on one face of the current collector 12.

Figure 20:
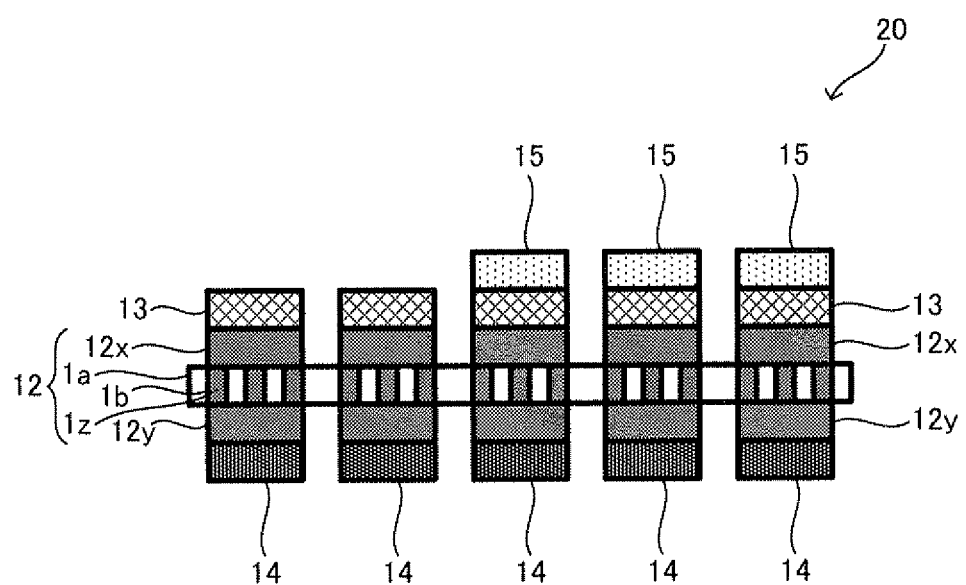
FIG. 20 is a cross-sectional view illustrating a stacked body 20.
Figure 21:
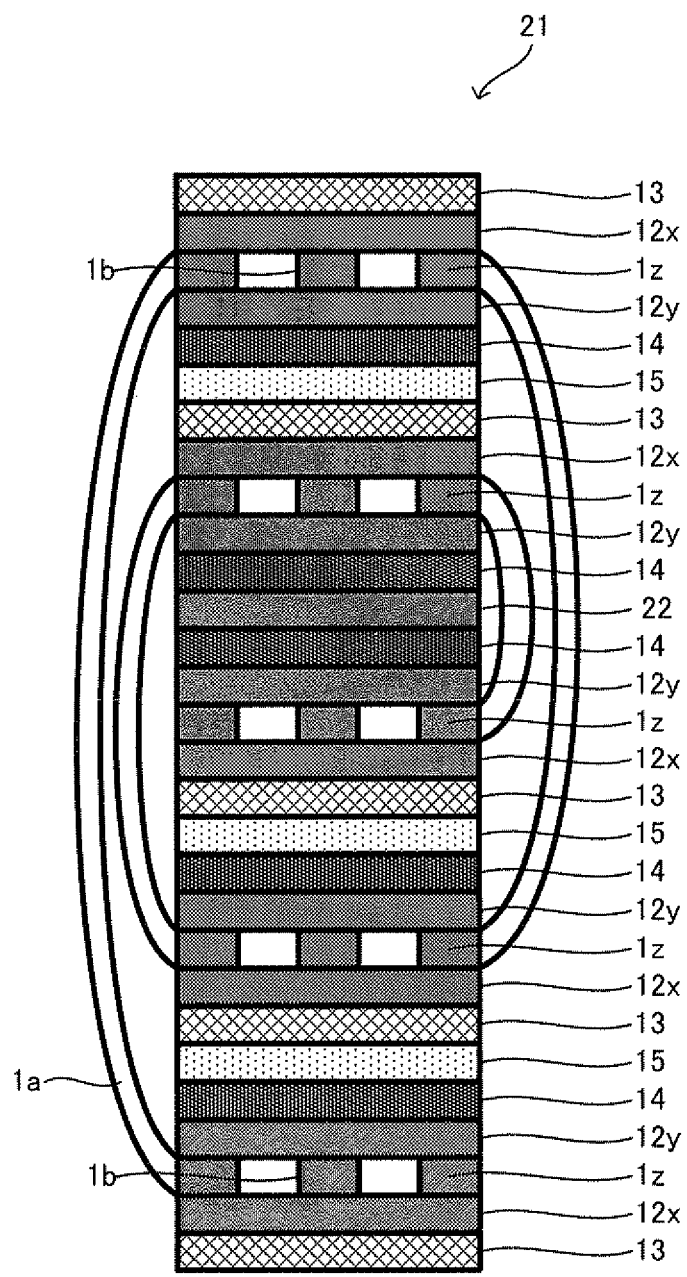
FIG. 21 is a cross-sectional view illustrating a wound body 21.

FIG. 20 is a cross-sectional view illustrating a stacked body 20 including the current collector 12, the electrodes (cathode layers 13 ... and anode layers 14 ... ), and the electrolyte layers 15. FIG. 21 is a cross-sectional view simply illustrating a wound body 21 produced by winding the stacked body 20 around a shaft center 22. In FIGS. 20 and 21, the same reference numerals as those used in FIGS. 15 to 19 are given to the same elements, and the description thereof will not be repeated.

The stacked body 20 has the current collector 12, the cathode layers 13, 13, ..., the anode layers 14, 14, ..., and the electrolyte layers 15, 15, .... The cathode layers 13, 13, ... are disposed on the surfaces of the electron-conducting portions 12x, 12x, ... of the current collector 12. The anode layers 14, 14, ... are disposed on the surfaces of the electron-conducting portions 12y, 12y, ... of the current collector 12. The electrolyte layers 15, 15, ... are disposed on the surfaces of the cathode layers 13, 13, .... The cathode layers 13 ... disposed on the surfaces of the electron-conducting portions 12x ... and the anode layers 14 ... disposed on the surfaces of the electron-conducting portions 12y ... face each other with the current collector 12 interposed therebetween. In the stacked body 20, the cathode layers 13, 13, ... and the anode layers 14, 14, ... do not contact with the insulating substrate 1a.

The wound body 21 is formed by winding the stacked body 20 around the shaft center 22 with a rectangular cross-section.

In the wound body 21, a plurality of single batteries disposed on the upper side of the shaft center 22 are connected to each other in series and a plurality of single batteries disposed on the lower side of the shaft center 22 are connected to each other in series. Thus, since the upper and lower surfaces of the shaft center 22 are connected to the anode layers 14, 14, . . . , a single battery group including the plurality of single batteries connected to each other in series on the upper side of the shaft center 22 is connected in parallel to a single battery group including the plurality of single batteries connected to each other in series on the lower side of the shaft center 22.

As shown in FIG. 21, the wound body 21 also has the current collectors 12. Accordingly, even with the configuration of the wound body 21 according to the invention, it is possible to provide the battery capable of improving productivity and stability. As described above, in the wound body 21, the single batteries can be connected to each other in series and in parallel. Accordingly, by the configuration including the wound body 21, it is possible to provide the battery which is flexible in terms of module design.

According to the wound body 21, in the same manner as the wound body 17, the number of single batteries connected to each other in series can be easily increased by lengthening the length of the wound stacked body 20 in the wound direction (right and left directions in FIG. 20); thereby it is possible to provide the battery of which voltage design can be easily implemented. Like the wound body 17, the cathode layers 13, 13, . . . , the anode layers 14, 14, . . . , and the electrolyte layer 15, 15, . . . are not disposed in the curved portions of the wound body 21. With such a configuration, not only the electrode or the electrolyte can be prevented from being separated from the curved portions when the battery including the wound body 21 is produced or used, but also the volume of the curved portions which do not contribute to power generation can be reduced; thereby improving the energy density and the output density of the battery including the wound body 21. In addition, since the winding mechanism of the wound body 21 is simple, the production speed may be made faster.

Figure 22:
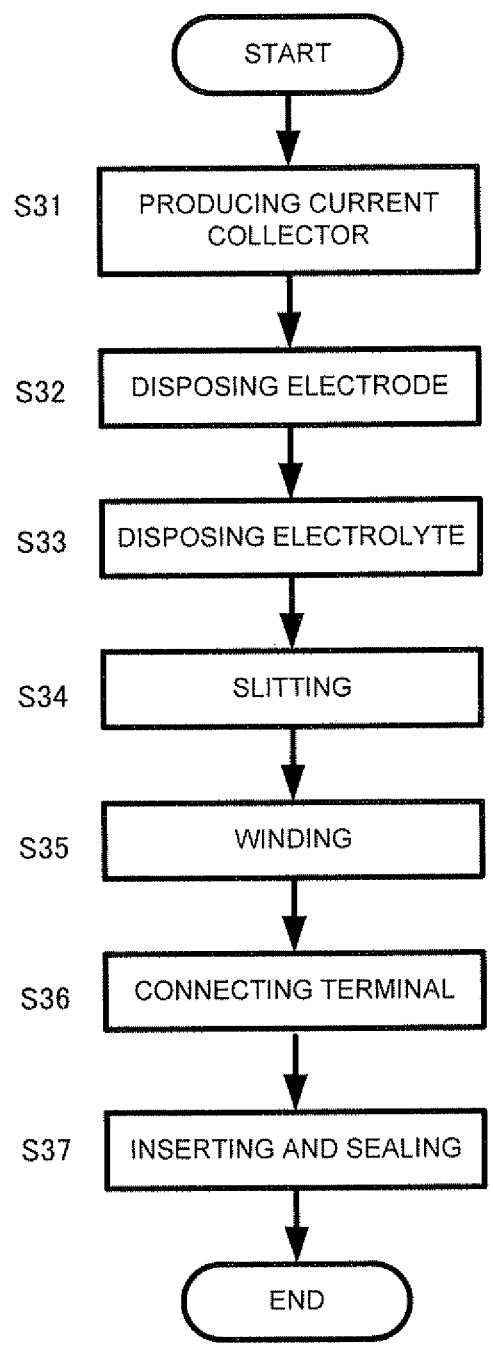
FIG. 22 is a flowchart illustrating a method for producing a battery.
Figure 23:
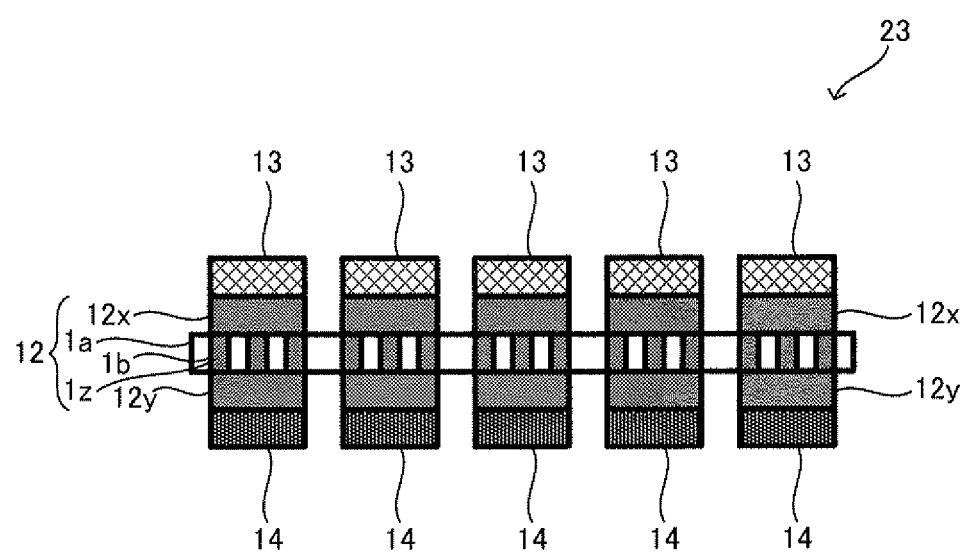
FIG. 23 is a cross-sectional view illustrating an electrode body 23.
Figure 24:
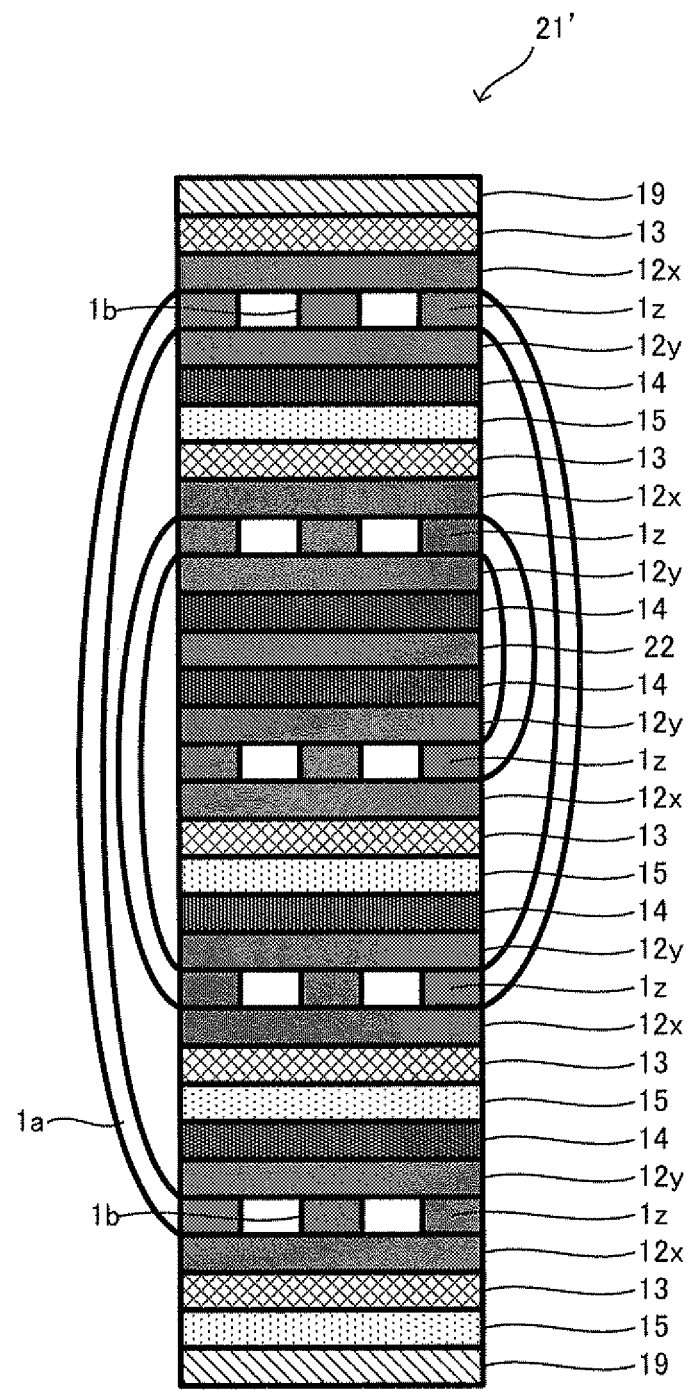
FIG. 24 is a cross-sectional view illustrating a wound body 21'.
Figure 25:
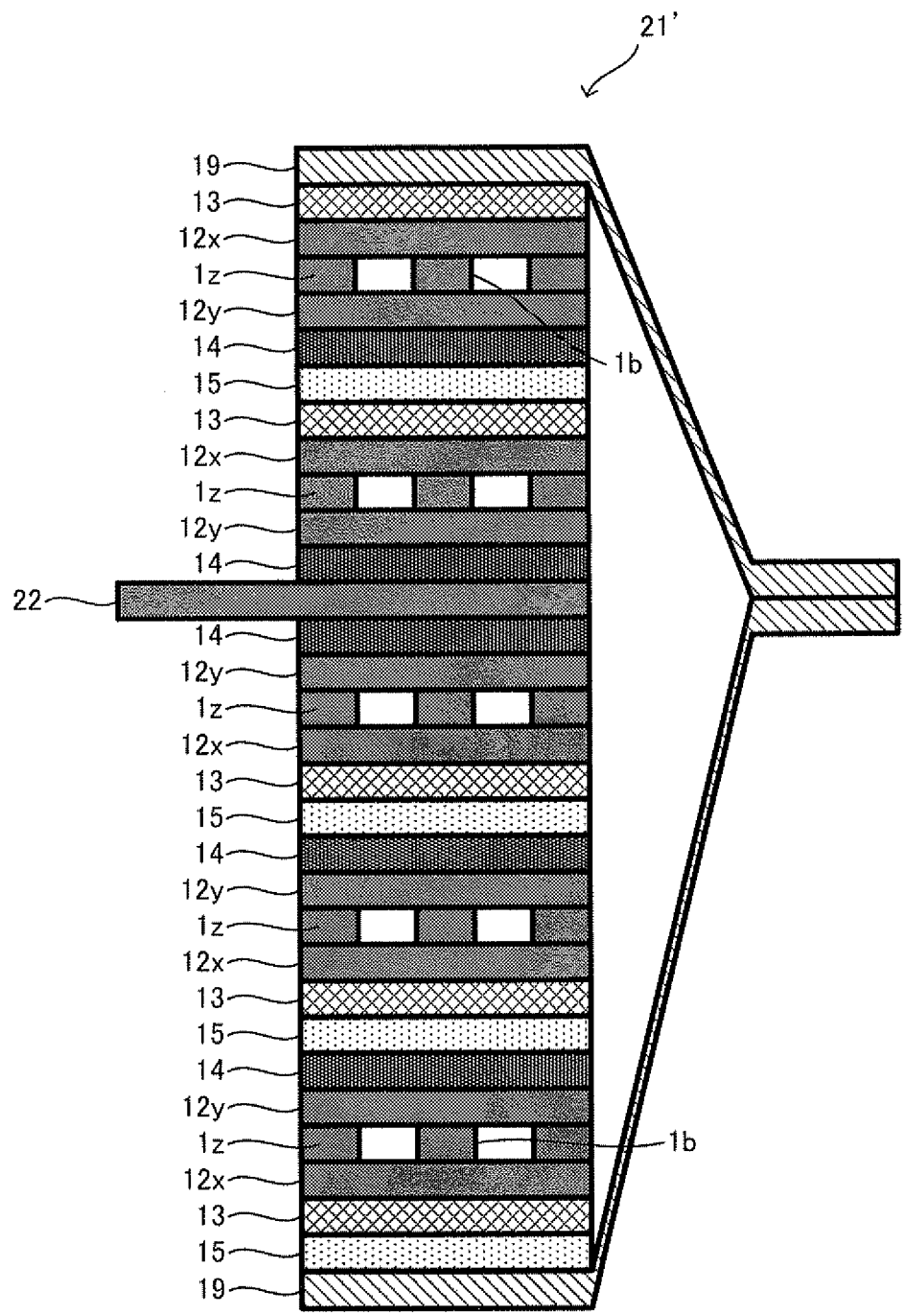
FIG. 25 is a cross-sectional view illustrating the wound body 21'.

FIG. 22 is a flowchart illustrating a method for producing the battery according to the invention. As shown in FIG. 22, the method for producing the battery according to the invention includes: a step of producing the current collector (S31), a step of disposing the electrodes (S32), a step of disposing the electrolyte (S33), a slitting step (S34), a winding step (S35), a step of connecting terminals (S36), and an insertion sealing step (S37). FIGS. 23 to 25 are diagrams illustrating steps of producing the battery according to the invention. FIG. 23 is a cross-sectional view illustrating an electrode body 23 produced in the step of disposing the electrodes. FIG. 24 is a cross-sectional view illustrating a wound body 21' to which terminals 19, 19, . . . are connected in the step of connecting the terminals. FIG. 25 is a cross-sectional view illustrating the wound body 21' when viewed from the right side of FIG. 24. In order to facilitate understanding of the wound body 21', a part of the insulating substrate 1a are not shown in FIG. 25. Hereinafter, an example of the method for producing the battery according to the invention will be described with reference to FIGS. 20 to 25.

The step of producing the current collector (hereinafter, referred to as "S31") is a step of producing the current collector 12. More specifically, S31 is a step of producing the current collector 12 in accordance with S1 to S5.

The step of disposing the electrodes (hereinafter, referred to as "S32") is a step of producing the electrode body 23 shown in FIG. 23 by disposing the cathode layers 13, 13, . . . in a manner to contact with the electron-conducting portions 12x, 12x, . . . of the current collector 12 produced in S31 and disposing the anode layers 14, 14, . . . in a manner to contact with the electron-conducting portions 12y, 12y, . . . . S32 is not particularly limited as long as the cathode layers 13, 13, . . . can be disposed in a manner to contact with the electron-conducting portions 12x, 12x, . . . and the anode layers 14, 14, . . . can be disposed in a manner to contact with the electron-conducting portions 12y, 12y, . . . . In S32, for example, the cathode layers 13, 13, . . . are formed at once on one face of the current collector 12 by alternately coating and drying a cathode composition on the surfaces of all the electron-conducting portions 12x, 12x, . . . by a gravure printing method, and then the anode layers 14, 14, . . . are formed at once on the other face of the current collector 12 by alternately coating and drying an anode composition on the surfaces of the electron-conducting portions 12y, 12y, . . . by the gravure printing method. Thus, since the cathode layers 13, 13, . . . may be formed at once on one face and the anode layers 14, 14, . . . may be formed at once on the other face of the current collector 12 respectively, by the above steps, the electrode body 23 may easily be produced.

The step of disposing the electrolyte layer (hereinafter, referred to as "S33") is a step of disposing the electrolyte layers 15, 15, . . . only on the surfaces of the electrode layers disposed on the side of the electrode body 23 produced in S32. S33 is not particularly limited as long as the electrolyte layers 15, 15, . . . may be disposed only on the surfaces of the electrode disposed on one side of the electrode body 23. S33, for example, may be a step of producing the stacked body 20 shown in FIG. 20 by coating and drying an electrolytic composition on the surfaces the cathode layers 13, 13, . . . disposed on one side of the electrode body 23 by a gravure printing method.

The slitting step (hereinafter, referred to as "S34") is a step of shortening the length (length in the rear/front direction in FIG. 20) of the stacked body 20 in the depth direction.

The winding step (hereinafter, referred to as "S35") is a step of producing the stacked body 21 shown in FIG. 21 by winding the stacked body 20 around the shaft center 22 formed of a stainless steel having an unevenness on the front and rear surfaces with 53 mm in width×65 mm in depth×1 mm in thickness, while folding the insulating substrate 1a of the uncoated portion in the stacked body 20 arranged in the length in the depth direction in S34. For example, S35 may be a step of producing the wound body 21 by winding the stacked body 20 around the shaft center 22 while folding the insulating substrate 1a of the uncoated portions so that the anode layers 14, 14, . . . come into contact with the front and rear surfaces of the shaft center 22. In this embodiment, the shaft center 22 also functions as a terminal and comes into contact with the electron-conducting portions 12y, 12y, . . . by perforating the anode layers 14, 14, . . . by the unevenness present on the front and rear surfaces of the shaft center 22. In the wound body 21 produced through S35, it is desirable that the right end surfaces and the left end surfaces of the cathode layer 13 and the anode layer 14 facing each other with the electrolyte layer 15 interposed therebetween are all aligned at position in FIG. 21. The wound body 21 with such a configuration can be produced in a state where the length thereof is allowed to be same as the length of the uncoated portions located in the outermost circumference of the wound body 21.

The step of connecting terminals (hereinafter, referred to as "S36") is a step of connecting the terminals 19, 19, . . . to the electron-conducting portions 12x, 12x, . . . of the wound body 21 produced in S35. S36 is not particularly limited as long as the terminal 19, 19, . . . may be connected to the electron-conducting portions 12x, 12x, . . . coming into contact with the cathode layers 13, 13, . . . disposed in both ends of the single battery in a stacked direction. For example, S36 may be a step of producing the wound body 21' shown in FIGS. 24 and 25 by disposing the terminals 19, 19, . . . formed of a stainless steel foil having an unevenness on the surface thereof in the upper and lower ends of the wound body 21, perforating the cathode layers 13, 13, . . . by the unevenness of the terminals 19, 19, . . . and connecting the terminals 19, 19, . . . to the electron-conducting portions 12x, 12x, . . . .

The insertion sealing step (hereinafter, referred to as "S37") is a step of producing the battery including the wound body 21' by inserting and sealing the wound body 21' produced in S36 into a case. For example, S37 may be a step of producing the battery including the wound body 21' by welding the terminals 19, 19 of the wound body 21' produced in S36 to the case, inserting the wound body 21' into the case, and then laminating and sealing the case accommodating the wound body 21'.

Thus, the battery including the current collector 12 can be produced even with this configuration. As described above, the productivity and stability of the battery are improved by providing the current collector 12. Therefore, according to the invention, it is possible to provide the method for producing the battery capable of improving the productivity and stability.

In the above description of the producing the battery including the wound body 21' according to the invention, the terminals 19, 19, . . . formed of the stainless steel foil having the unevenness on the surface thereof are disposed in the upper and lower ends of the wound body 21, the cathode layer 13 are perforated by the unevenness of the terminals 19, 19, . . . , and the terminals 19, 19, . . . are connected to the electron-conducting portion 12x, 12x, . . . in S36. However, the step of connecting the terminals in the method for producing the battery of the invention is not limited to this configuration. The step of connecting the terminals may include: removing the cathode layers 13, 13 respectively disposed in the upper and lower ends of the wound body 21 by a known method; and connecting the terminals 19, 19, . . . to the surface of the electron-conducting portion 12x, 12x, . . . exposed by the removal of the cathode layer 13, 13, . . . . The step may also include bringing exterior materials also functioning as a terminal into contact directly with the electron-conducting portions 12x, 12x, . . . which had been contacted with the removed cathode layers 13, 13, . . . or bringing lead terminals into contact with the electron-conducting portions 12x, 12x, . . . . The step may otherwise includes inserting the wound body into a doughnut-shaped case and bringing the doughnut-shape case into contact with the inner circumferential surface and the outer circumferential surface of the wound body coming into contact with the case also functioning as a terminal.

In the above description of the battery including the wound body 21' and the method for producing the battery according to the invention, the shaft center 22 with the rectangular cross-sectional surface is used. However, the shaft center used in the invention is not limited thereto. When the shaft center is used in the invention, the cross-sectional shape of the shaft center may be circle, ellipse, or polygon such as triangle, pentagon, or hexagon.

In the above description of the battery including the wound body 21' and the method for producing the battery according to the invention, an embodiment in which the electrolyte layers 15, 15, . . . are disposed only on the surface of the cathode layers 13, 13, . . . disposed on one face of the current collector 12 was described; but the invention is not limited thereto. The electrolyte layers 15, 15, . . . may be disposed even between the cathode layers 13, 13, . . . as well as the surfaces of the cathode layers 13, 13, . . . . Moreover, the electrolyte layers 15, 15, . . . may be disposed only on the surfaces of the anode layers 14, 14, . . . disposed on the other face of the current collector 12, or the electrolyte layers 15, 15, . . . may be disposed on the surface of the anode layers 14, 14, . . . disposed on the other face of the current collector 12 and even between the anode layers 14, 14, . . . disposed on the other face of the current collector. So as to provide the battery which can easily improve the energy density and the output density, it is desirable that the electrolyte layers 15, 15, . . . are disposed only on the surfaces of the cathode layers 13, 13, . . . disposed on one face of the current collector 12 or on the surface of the anode layers 14, 14, . . . disposed on the other face of the current collector 12.

In the above description of the battery including the wound body 21' and the method for producing the battery according to the invention, the cathode layers 13, 13, . . . are disposed only on one face of the current collector 12 or the anode layers 14, 14, . . . are disposed only on the other face of the current collector 12; however, the invention is not limited thereto. When the shaft center is used in the invention, the cathode layers 13 . . . and the anode layers 14 . . . may be alternately disposed on one face and the other face of the current collector, in the same manner as the stacked body 16.

Figure 26:
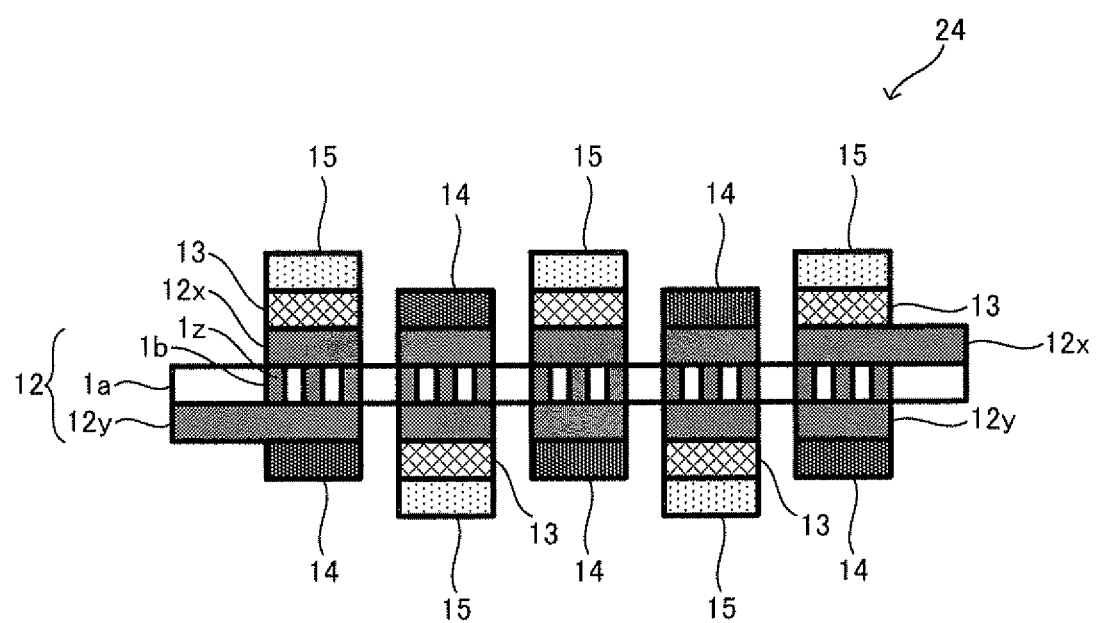
FIG. 26 is a cross-sectional view illustrating a stacked body 24.
Figure 27:
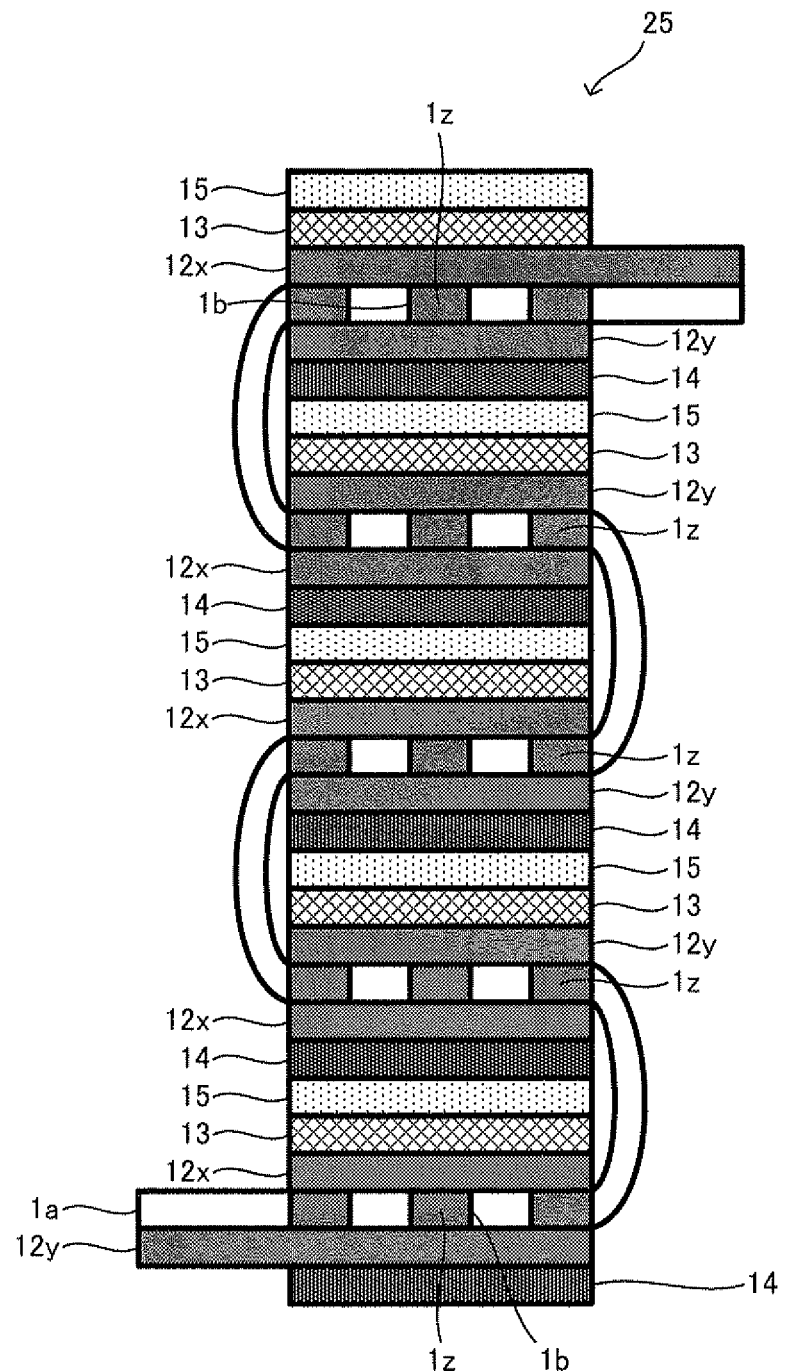
FIG. 27 is a cross-sectional view illustrating a structure body 25.

FIG. 26 is a cross-sectional view illustrating a stacked body 24 including the current collector 12, the electrodes (cathode layers 13 and anode layers 14 . . . ) and the electrolyte layer 15. FIG. 27 is a cross-sectional view simply illustrating a structure body 25 produced by folding the stacked body 24 in a zigzag form. In FIGS. 26 and 27, the same reference numerals as those used in FIGS. 15 to 19 are given to the same elements, and the description thereof will not be repeated.

The stacked body 24 includes the current collector 12, the cathode layers 13, 13, . . . the anode layers 14, 14, . . . and the electrolyte layers 15, 15, . . . . The cathode layers 13, 13, . . . and the anode layers 14, 14, . . . are alternately disposed in the planar direction on the surfaces of the electron-conducting portions 12x, 12x, . . . and the electron-conducting portions 12y, 12y, . . . of the current collector 12. The electrolyte layers 15, 15, . . . are disposed on the surfaces of the cathode layers 13, 13, . . . disposed on one face and the other face of the current collector 12. The cathode layers 13 disposed on the surface of the electron-conducting portion 12x faces the anode layers 14 disposed on the surface of the electron-conducting portion 12y with the current collector 12 interposed therebetween. In the stacked body 24, the cathode layers 13, 13, . . . and the anode layers 14, 14, . . . do not contact with the insulating substrate 1a.

The structure body 25 is produced by folding the stacked body 24 in a zigzag form so that the cathode layer 13 faces the anode layer 14 with the electrolyte layer 15 interposed therebetween, while bending the insulating substrate 1a of the stacked body 24. In the structure body 25, single batteries including: a pair of cathode layers 13 . . . , the electrolyte layers 15, and the anode layers 14, are connected to each other in series in the upper-and-lower direction in FIG. 27.

As shown in FIG. 27, the structure body 25 of the battery according to the invention has the current collectors 12 according to the invention. Accordingly, even with the configuration of the structure body 25, it is possible to provide the battery capable of improving productivity and stability. In the structure body 25, the number of single batteries connected to each other in series can be easily increased by lengthening the length (length in the right and left directions in FIG. 26) of the stacked body 24 to be folded; thereby it is possible to provide the battery of which voltage design can be easily implemented. In the structure body 25, the electrode layer and the electrolyte layer 15 are not disposed in the left end and right end (the curved portions) of the curved structure body 25. With such a configuration, not only the electrode layers or the electrolyte layers can be prevented from being separated from the curved portions when the battery including the structure body 25 is produced or used, but also the volume of the curved portions which do not contribute to power generation can be reduced, thereby improving the energy density and the output density of the battery including the structure body 25. Moreover, since the winding mechanism of the structure body 25 is simple, the production speed may be made faster.

Figure 28:
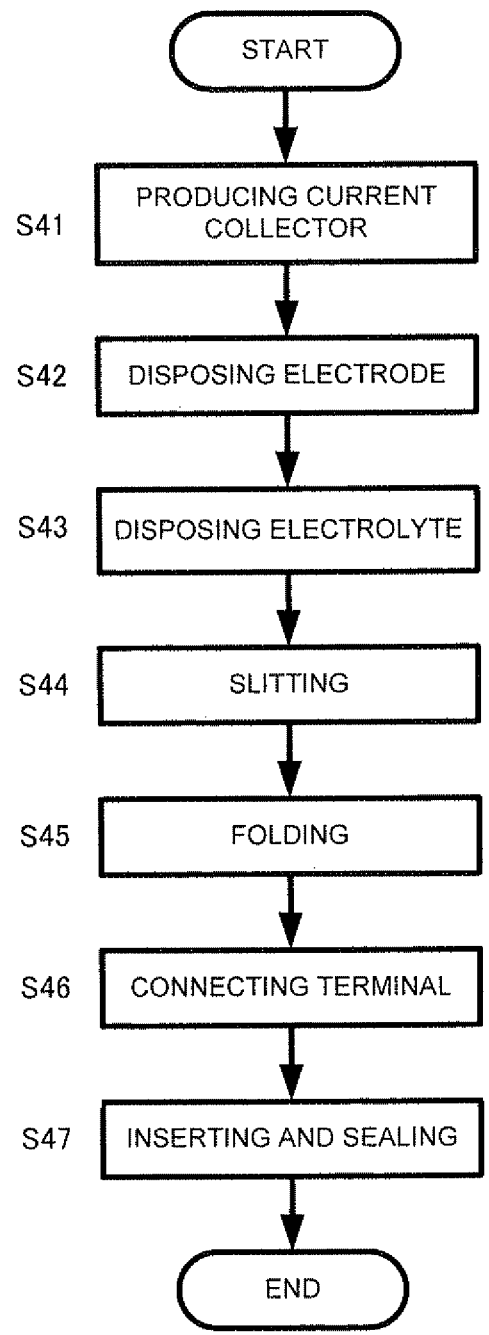
FIG. 28 is a flowchart illustrating a method for producing a battery.
Figure 29:
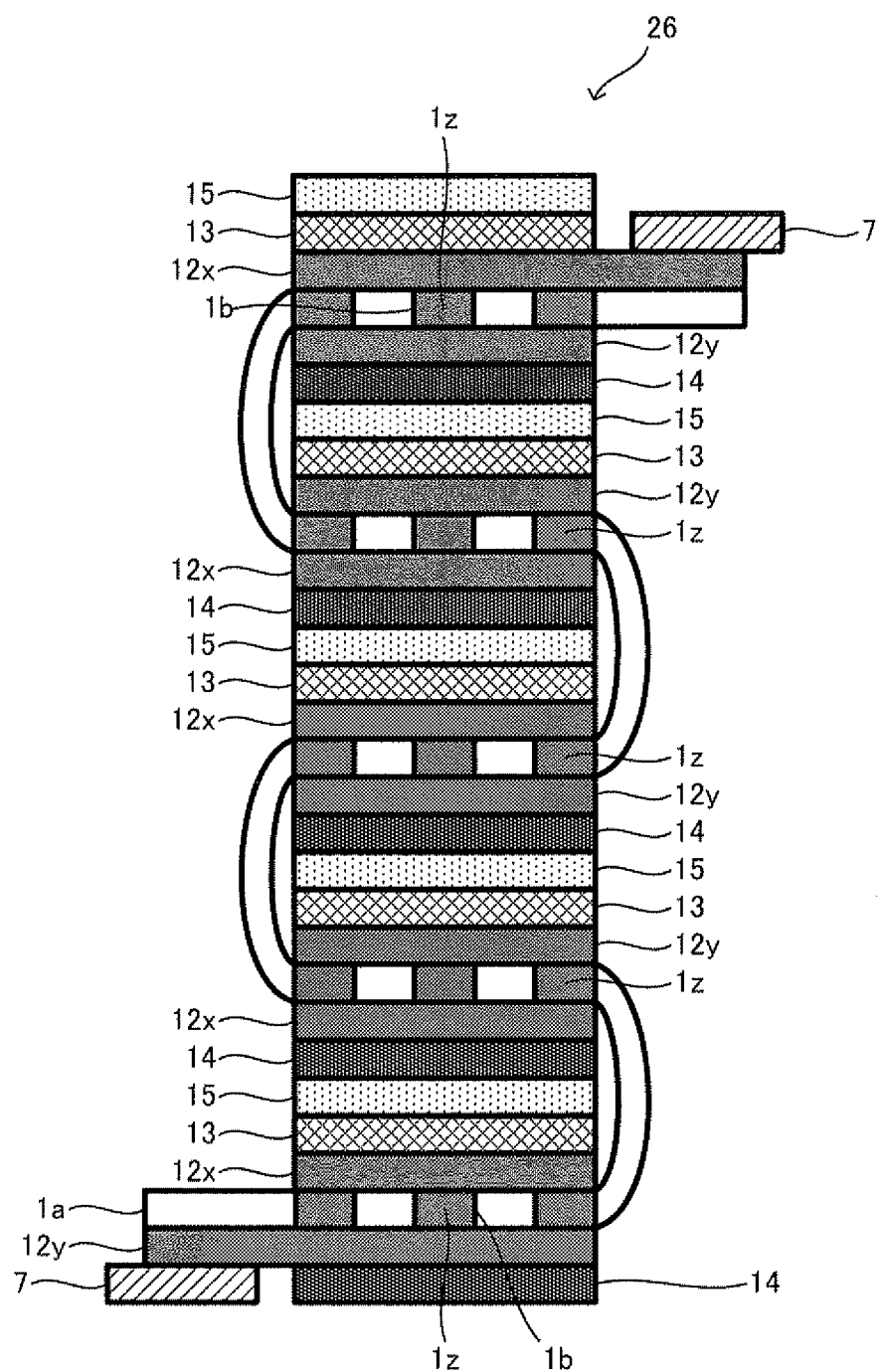
FIG. 29 is a cross-sectional view illustrating a structure body 26.

FIG. 28 is a flowchart illustrating a method for producing the battery according to the invention. As shown in FIG. 28, the method for producing the battery according to the invention includes: a step of producing the current collector (S41), a step of disposing the electrodes (S42), a step of disposing the electrolyte (S43), a slitting step (S44), a folding step (S45), a step of connecting terminals (S46), and an insertion sealing step (S47). FIG. 29 is a diagram illustrating the steps of producing the battery according to the invention and is a cross-sectional view illustrating the structure body 26 to which the terminals 7, 7 are connected in the step of connecting the terminals. Hereinafter, an example of the method for producing the battery according to the invention will be described with reference to FIGS. 18 and 26 to 29.

The step of producing the current collector (hereinafter, referred to as "S41") is a step of producing the current collector 12. More specifically, S41 is a step of producing the current collector 12 according to S1 to S5.

The step of disposing the electrodes (hereinafter, referred to as "S42") is a step of producing the electrode body 18 shown in FIG. 18 by disposing the cathode layers 13, 13, . . . and the anode layers 14, 14, . . . in a manner to contact with the electron-conducting portions 12x, 12x, . . . or the electron-conducting portions 12y, 12y, . . . of the current collector 12 produced in S41. S42 is not particularly limited as long as the cathode layers 13, 13, . . . and the anode layers 14, 14, . . . can be disposed in a manner to contact with the electron-conducting portions 12x, 12x, . . . or the electron-conducting portions 12y, 12y, . . . . S42 is carried out in the same manner as S22

The step of disposing the electrolyte layer (hereinafter, referred to as "S43") is a step of disposing the electrolyte layers 15, 15, . . . only on the surfaces of the cathode layers 13, 13, . . . disposed on one face and the other face of the electrode body 18 produced in S42. S43 is not particularly limited as long as the electrolyte layers 15, 15, . . . can be disposed only on the surfaces of the cathode layers 13, 13, . . . . S43 is carried out in the same manner as S23.

The slitting step (hereinafter, referred to as "S44") is a step of removing a part of the cathode layers 13, 13, . . . , the anode layers 14, 14, . . . , and the electrolyte layers 15, 15, . . . protruding as uncoated portions, where it is not wanted to be coated by the cathode composition or the anode composition in terms of design, among the cathode layers 13, 13, . . . , the anode layers 14, 14, . . . , and the electrolyte layers 15, 15, . . . of the electrode body 18 in which the electrolyte layers 15, 15, . . . are disposed in S43. S44 may be a step of producing the stacked body 24 shown in FIG. 26 by the same procedure as that of S15.

The folding step (hereinafter, referred to as "S45") is a step of producing the structure body 25 shown in FIG. 27 by folding the insulating substrate 1a of the uncoated portions in the stacked body 24 in which the uncoated portions are defined in S44 in a zigzag form. S45 may be a step of producing the structure body 25 by folding the insulating substrate 1a of the uncoated portions in a zigzag form so that the cathode layer 13 faces the anode layer 14 with the electrolyte layer 15 interposed therebetween. In the structure body 25 produced through S45, it is desirable that the right end surfaces and the left end surfaces of the cathode layer 13 and the anode layer 14 facing each other with the electrolyte layer 15 interposed therebetween are all aligned at position in FIG. 26. The structure body 25 with such a configuration can be produced when the uncoated portions of the stacked body 24 has a certain length.

The step of connecting terminals (hereinafter, referred to as "S46") is a step of connecting the terminals 7, 7, . . . to the electron-conducting portions 12x . . . and 12y of the structure body 25 produced in S45. S46 is not particularly limited as long as the terminal 7 can be connected to the electron-conducting portion 12x coming into contact with the cathode layer 13 disposed in one end of the single battery in the stacked direction and the terminal 7 can be connected to the electron-conducting portion 12y coming into contact with the anode layer 14 disposed in the other end of the single battery in the stacked direction. S46 may be a step of producing the structure body 26 shown in FIG. 29 by connecting the terminals 7, 7 in the same procedure as that of S16.

The insertion sealing step (hereinafter, referred to as "S47") is a step of producing the battery including the structure body 26 by inserting and sealing the structure body 26 produced in S46 into a case. For example, S47 may be a step of producing the battery including the structure body 26, by welding the terminals 7, 7, . . . of the structure body 26 produced in S46 to the case, inserting the structure body 26 into the case, and then laminating and sealing the case accommodating the structure body 26.

Thus, even such a configuration, the battery including the current collector 12 can be produced. As described above, the productivity and stability of the battery are improved by providing the current collector 12. Therefore, according to the invention, it is possible to provide the method for producing the battery capable of improving the productivity and stability.

In the above description of the battery including the structure body 25 and the method for producing the battery according to the invention, there has been described that the electrolyte layers 15, 15, . . . are disposed only on the surfaces of the cathode layers 13, 13, . . . disposed on one face and the other face of the current collector 12; however, the invention is not limited thereto. In the battery having the structure body produced by folding the current collector 12 in a zigzag form according to the invention, the electrolyte layers 15, 15, . . . may be disposed on the surfaces of the anode layers 14, 14, . . . disposed on one face and the other face of the current collector 12. Moreover, the electrolyte layers 15, 15, . . . may be disposed on the surfaces of all the cathode layers 13, 13, . . . and the anode layers 14, 14, . . . ; or the electrolyte layers 15, 15, . . . may be disposed between the cathode layers 13, 13, . . . and the anode layers 14, 14, . . . . So as to provide the battery of which energy density and the output density can be easily improved, it is desirable that the electrolyte layers 15, 15, . . . are disposed only on the surfaces of the cathode layers 13, 13, . . . and/or the anode layers 14, 14, . . . disposed on one face and the other face of the current collector 12.

In the above description of the method for producing the battery according to the invention, the terminals 7, 7, . . . are connected in S46 in the same procedures as that of S16, but the step of connecting the terminals in the method for producing the battery including the current collector 12 folded in a zigzag form is not limited to the mode. The step of connecting the terminals may include removing the electrolyte layers 15, 15, . . . and the cathode layers 13, 13, . . . disposed in the upper end of the structure body 25, removing the anode layers 14, 14, . . . disposed in the lower end of the structure body 25, and then connecting the terminals 7, 7, . . . to the exposed electron-conducting portions 12$x$ . . . and 12$y$. Moreover, the step of connecting the terminals may include: disposing the terminals formed of a stainless steel foil having an unevenness on the surfaces thereof in the upper end and the lower end of the structure body 25, perforating the cathode layers 13 . . . and the electrolyte layers 15 . . . or the anode layers 14 . . . by the unevenness of the terminals, and then connecting the terminals to the electron-conducting portions 12$x$, 12$y$. The step may otherwise include bringing exterior materials also functioning as a terminal into contact directly with the electron-conducting portions 12$x$ . . . which had been contacted with the removed cathode layers 13 . . . or the electron-conducting portions 12$y$ . . . which had been contacted with the removed anode layers 14 . . . .

In the above description of the method for producing the battery according to the invention, the cathode layers and/or the anode layers are formed in the surfaces of the electron-conducting portions disposed in the current collector; however, the invention is not limited to the method for producing the battery. In the method for producing the battery, the cathode layers or the anode layers may be formed in the surfaces of a known substrate or an electrolyte layer, or the battery according to the invention may be produced by disposing the current collector according to the invention is disposed on the surfaces of the formed cathode layers and/or anode layers. Even with such a configuration, the electron-conducting portions and the electrodes disposed in the current collector can be connected to each other at once, thereby improving productivity.

INDUSTRIAL APPLICABILITY

The current collector and the battery according to the invention are usable for electric automobiles, hybrid automobiles, or the like. The method for producing the current collector and the method for producing the battery according to the invention are usable when producing the batteries used for electric automobiles, hybrid automobiles, or the like.

The invention claimed is:
1. A battery comprising:
 (a) a current collector comprising:
  an insulating substrate, and
  electron-conducting portions respectively disposed on one face and another face of the insulating substrate;
 (b) a cathode layer and an anode layer respectively disposed to be in contact with the electron-conducting portions of the current collector; and
 (c) an electrolyte layer disposed to be in contact with the cathode layer and the anode layer, wherein
 at least two of the electron-conducting portions are disposed in a planar direction on the one face of the insulating substrate,
 the electron-conducting portions which are disposed on said another face of the insulating substrate are disposed in a manner to face at least one of the electron-conducting portions disposed on the one face of the insulating substrate so that the insulating substrate is interposed therebetween,
 the electron-conducting portions disposed on the one face of the insulating substrate and the electron-conducting portions disposed on said another face of the insulating substrate, both of which face each other with the insulating substrate interposed therebetween, are connected to each other via electron conductors disposed in holes penetrating the insulating substrate, and
 the current collector, the cathode layer, the anode layer, and the electrolyte layer are laminated or wound by bending a portion between the adjacent electron-conducting portions arranged on the one face of the insulating substrate.

* * * * *